(12) United States Patent
Rao et al.

(10) Patent No.: US 7,455,886 B2
(45) Date of Patent: *Nov. 25, 2008

(54) NANOCOMPOSITE MATERIALS AND AN IN-SITU METHOD OF MAKING SUCH MATERIALS

(75) Inventors: YuanQiao Rao, Pittsford, NY (US); Samuel Chen, Penfield, NY (US); Charles W. Lander, Wayland, NY (US); Tomohiro Ishikawa, Rochester, NY (US); Theodore R. Vandam, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/208,661

(22) Filed: Aug. 22, 2005

(65) Prior Publication Data
US 2007/0254107 A1 Nov. 1, 2007

(51) Int. Cl.
*B05D 3/04* (2006.01)
(52) U.S. Cl. .............. 427/385.5; 427/335; 524/430
(58) Field of Classification Search .......... 428/1.1, 428/411.1, 211, 1.3, 323, 328, 332, 357, 428/402; 427/162, 372.2, 385.5, 217; 524/497, 524/430, 435, 437
See application file for complete search history.

(56) References Cited

U.S. PATENT DOCUMENTS

| | | | |
|---|---|---|---|
| 4,528,311 A | 7/1985 | Beard et al. | |
| 5,100,970 A | 3/1992 | Roberts et al. | |
| 5,225,244 A * | 7/1993 | Aharoni et al. | 427/240 |
| 6,028,651 A | 2/2000 | Abileah et al. | |
| 6,068,914 A | 5/2000 | Boire et al. | |
| 6,419,989 B1 | 7/2002 | Betz et al. | |
| 6,599,631 B2 | 7/2003 | Kambe et al. | |
| 6,656,990 B2 | 12/2003 | Shustack et al. | |
| 6,667,360 B1 * | 12/2003 | Ng et al. | 524/492 |
| 6,713,559 B1 | 3/2004 | Armbrust et al. | |
| 6,822,713 B1 | 11/2004 | Yaroshchuk et al. | |
| 6,828,381 B1 | 12/2004 | Armbrust et al. | |
| 6,853,424 B2 | 2/2005 | Elman et al. | |
| 6,872,765 B1 | 3/2005 | Betz et al. | |
| 2001/0026338 A1 | 10/2001 | Aminaka | |
| 2004/0044127 A1 | 3/2004 | Okubo et al. | |
| 2006/0066946 A1 * | 3/2006 | Liu et al. | 359/485 |

FOREIGN PATENT DOCUMENTS

| | | |
|---|---|---|
| EP | 0 509 327 A1 | 10/1992 |
| EP | 0 661 558 A1 | 7/1995 |
| EP | 1 279 443 A2 | 1/2003 |
| JP | 06148430 | 5/1994 |
| WO | 02/08343 A2 | 1/2002 |

OTHER PUBLICATIONS

H. Schmidt et al., "Organically Modified Ceramics and Their Applications;" Journal of Non-Crystalline Soldids, 121 (1990), 428-435; Elsevier Science Publishers B. V. (North-Holland).
H.I. Elim, et al., "Ultrafast optical nonlinearity in poly(methylmethacrylate)—$TiO_2$ nanocomposites," Applied Physics Letters, vol. 82, No. 16, Apr. 21, 2003, pp. 2691-2693.

* cited by examiner

*Primary Examiner*—Keith D. Hendricks
*Assistant Examiner*—Sophie Hon

(57) ABSTRACT

A method of fabricating a nanocomposite material includes generating nanoparticles in-situ with a polymer. A nanocomposite material includes a polymer having nanoparticles characterized by a dimension of not more than 50 nm.

14 Claims, 4 Drawing Sheets

200 nm 200 nm 200 nm 500 nm

1 μm 500 nm

NANOCOMPOSITE MATERIALS AND AN IN-SITU METHOD OF MAKING SUCH MATERIALS

FIELD OF THE INVENTION

The present invention relates to a novel nanocomposite materials and to a method of fabricating such nanocomposite material by the in-situ generation of nanoparticles in a polymer matrix.

BACKGROUND

Nanocomposite materials are comprised of two or more materials, with at least one of the materials including particles having no dimension greater than about several hundred nanometers (nm). Polymer-based nanocomposite materials include a filler material of nanoparticles dispersed in the matrix of the polymer material.

Nanocomposite materials have garnered interest in many technical fields requiring materials for optical, electronic, structural, and barrier applications. One reason for this interest is the potential to combine certain material characteristics of the polymer with those of the filler material. For example, many polymers are transparent and can be used in optical applications. However, in many optical applications it is often useful for the materials to have indices of refraction, or other optical properties, that are different than those of many polymers suitable for optical applications. For example, it would be beneficial to be able to provide a nanocomposite material having a filler material that increases the index of refraction of the material to a desired level, but does not have a significant adverse impact on the transparent nature of the polymer.

Nanocomposites can also be used to provide other material properties. For example, the mechanical properties of tensile strength and compressibility can be altered over those of the unfilled polymer. Beneficially, stronger and more durable materials can be made for structural applications. Moreover, the barrier and thermal properties of the polymer may be altered to a desired end via the incorporation of nanoparticles. Such nanocomposite materials may be used in disparate applications such as construction and packaging.

While polymer-based nanocomposite materials are promising, there are shortcomings in known nanocomposite materials and their methods of manufacture. For example, in order to achieve certain material characteristics and uniformity of these characteristics, it is beneficial for the nanoparticles to be homogeneously dispersed within the other polymer material of the nanocomposite. Often, this requires mixing at the nanometer scale level. However, the nanoparticles and the polymer material often have little or no affinity for one another. Thus, the mixing at the nanometer scale level is difficult to achieve.

Known attempts to address the difficulties presented by the lack of compatibility of the nanoparticles and the polymer material include surface treatment of the nanoparticles prior to mixing with the polymer. For example, U.S. Pat. No. 6,599,631 and U.S. Pat. No. 6,656,990 describe blending a polymer and inorganic particles to form hybrid materials. Specially prepared particles with well-controlled particle size and surface treatment of the particles are required.

Additionally, methods involving mechanical stressing have been used in an attempt to achieve a desired particle size or a more homogeneous dispersion of the particles within the polymer. Known methods include forced mixing using an extruder and injection molding. Unfortunately, such methods may result in the agglomeration of the nanoparticles. Thus, by many known methods of fabricating nanocomposite materials, the domain size of the nanoparticles is on the order of micrometers, which is too great for certain applications.

US Patent No. 2004/004127 to Okubo et al. discloses a polymeric nanocomposite film comprising a cellulose derivative and a polycondensation product of a condensation polymerizable reactive metal compound (but also including compounds containing silicon instead of a "metal" in the conventional sense used herein). The nanocomposite film further contains a plasticizer in an amount of 1 to 20 weight percent by weight. Example 1 of Okuba et al. involves casting a dope comprising titanium tetramethoxide in admixture with methylene chloride, ethanol, silica, and cellulose triacetate polymer. The materials comprise a relatively small amount of the metal alkoxide (less than 4 weight percent) compared to the amount of polymer. Furthermore, as shown in Table 1-1 of the patent, the amount of the polycondensation product in the nanocomposite was not more than 1.5% for metal-oxide nanoparticles, although as high as 20 percent for silicon. Also, as shown in Table 1-2, the average particle size (diameter) of the polycondensation product in the nanocomposite was not less that 90 nm (as measured by small-angle X-ray diffraction) for metal-oxide particles, although nanoparticles as small as 8 nm were obtained when the nanocomposite comprised mixtures of a metallic oxides and silicon oxides, the metallic oxides present in relatively small amounts.

It is believed that the larger size of the metallic oxide nanoparticles in the nanocomposites of Okubo et al., when the polycondensation product consisted only of the metallic oxides, was at least in part due to the relatively higher reactivity of the metallic-oxide precursors compared to the silicon-oxide precursors. Similarly, the lower concentration of the metallic oxides used in the nanocomposites may have been due to agglomeration of the more reactive metal-oxide precursors to the extent that the transparency of the nanocomposite was adversely effected. The concentration of the polycondensation product that could be used by Okubo et al. in the nanocomposites based on metallic oxides was, therefore, severely limited as compared to nanocomposites based on non-metallic oxides such as silicon dioxide.

Significantly, Okubo et al. did not find it necessary to prevent the metal-oxide precursors from reacting in the dope used to make the films. Instead, Okubo et al. state that the condensation polymerization of the reactive metal compound can be carried out in the solution (dope) containing the reactive metal compound or in a web formed on the support, but is preferably carried out in the solution. Evidence supports the conclusion that the reaction of the relatively reactive metal compound in Okubo et al. occurred to a significant extent prior to coating. This is believed to account for the fact that relatively higher concentrations of the metal-oxide nanoparticles (substantially greater than 1.5 weight percent) and/or relatively smaller sizes of the metal-oxide nanoparticles particles (with at least one dimension significantly less than 90 nm) could not be obtained by Okubo et al.

In view of the above, a problem in prior art techniques for fabricating polymer-based nanocomposites is that, with respect to the nanoparticles of a desired material, they may fail to achieve the level of homogeneity desired, the desired loading levels, the desired size of the nanoparticles, or a combination of these deficiencies. Likewise, obtaining polymer-based nanocomposites having desired optical or other properties have been a problem.

It would be desirable to obtain a nanocomposite comprising smaller metallic oxide nanoparticles and/or higher concentrations of the nanoparticulate material in a transparent nanocomposite, particularly a nanocomposite used to make an optical film. What is also needed is a method of fabricating nanocomposite materials that overcomes the shortcomings of the techniques previously discussed.

SUMMARY

The present invention is directed to a nanocomposite film comprising nanoparticles dispersed in a polymer matrix, which nanoparticles are the product of a condensation polymerizable reactive metal oxide compound, comprising a metallic atom and at least two hydrolyzable leaving groups, wherein the nanocomposite comprises an effective amount up to 10 weight percent of nanoparticles predominantly having a maximum diameter that is not more than 50 nm, as evident by transmission electron microscopy (TEM). Preferably, the nanoparticles are present at a concentration between 2.0 and 10.0 percent by weight of the nanoparticulate condensation product in the nanocomposite. Conversely, there is preferably a substantial absence (preferably less than 15 weight percent) of metal oxide nanoparticles having an average maximum diameter greater than 50 nm.

In accordance with another aspect of the present invention, a method of fabricating a nanocomposite material, as described above, includes generating inorganic nanoparticles in-situ within a polymer matrix by:

(a) forming a coating solution of a nanoparticle precursor and polymer dissolved in a substantially non-aqueous carrier liquid, comprising one or more organic solvents, wherein the nanoparticle precursor is a condensation polymerizable reactive metal compound comprising a metallic atom and at least two hydrolyzable leaving groups;

(b) applying the coating solution onto a substrate to form a film and then removing organic solvent from the coating solution to form a gel;

(c) converting the nanoparticle precursor, by hydrolysis and polycondensation reactions, into nanoparticles in the polymer matrix to form a nanocomposite; and (d) drying the nanocomposite to remove remaining organic solvent from the nanocomposite, wherein the nanocomposite is characterized by such generated inorganic nanoparticles predominantly having a maximum dimension of not more than 50 nm, preferably at a concentration of more than 2.0 percent by weight of the nanoparticulate condensation product in the nanocomposite.

As used herein, the term 'nanoparticle' includes regions of a nanocomposite material that is rich in metal oxide constituents used to make nanoparticles. The term diameter, with respect to the nanoparticles, refers to the "equivalent circular diameter" (ECD) of the nanoparticle. The majority of the nanoparticles have a diameter of not more than 50 nm and preferably at least 85 percent of the nanoparticles have a diameter of not more than 50 nm. In preferred embodiments, the average maximum diameter of the nanoparticles is also not more than 50 nm and has the same preferred size ranges. The particles should have such a diameter that they do not significantly or unduly influence the transparency of the eventual coating. The particle diameter can be determined by transmission electron microscopy.

BRIEF DESCRIPTION OF THE DRAWINGS

The embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
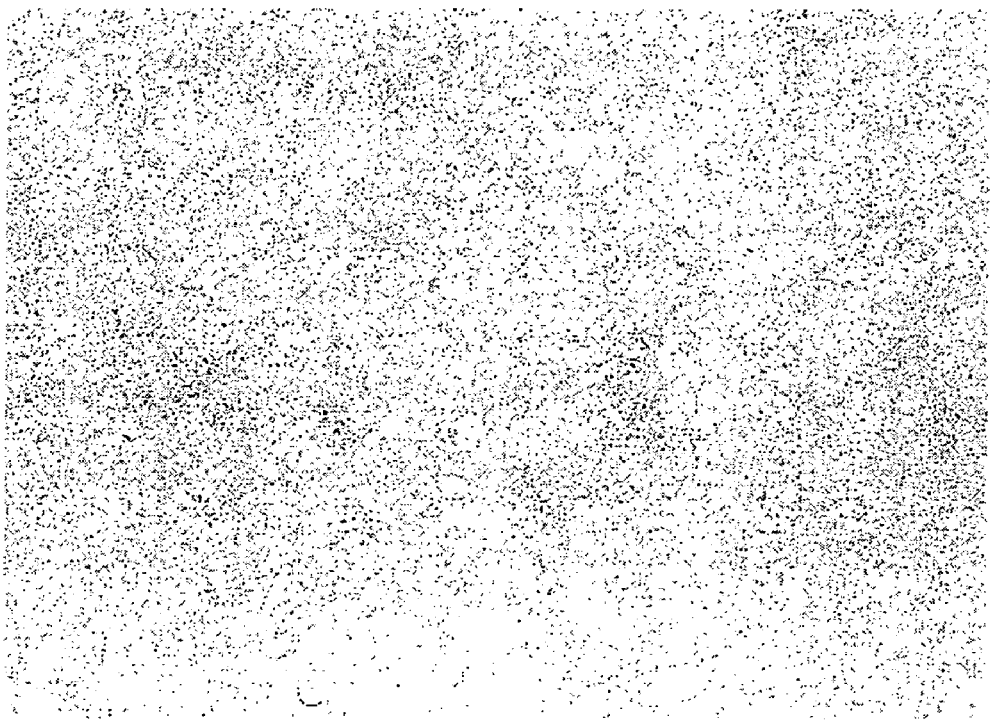
FIG. 1 is a transmission electron microscopy (TEM) image of one embodiment of a nanocomposite material in accordance with Example 1.

The invention has been described with reference to preferred embodiments. However, it will be appreciated that variations and modifications of such embodiments can be effected, by a person of ordinary skill in the art, without departing from the scope of the invention.

Briefly, the present invention relates to nanocomposite materials, comprising nanoparticles dispersed in the matrix of a polymer material, and methods of fabricating such nanocomposite materials. Notably, the nanoparticles are formed in-situ within the polymer material. In accordance with one embodiment of the method, a polymer material and a nanoparticle precursor are mixed in an organic solvent, which can comprise mixtures, to form a coating solution. The solvent substantially dissolves the polymer and substantially prevents the nanoparticle precursor molecules from reacting with one another in the coating solution. Beneficially, agglomeration of the nanoparticle precursor or a subsequent intermediate product is substantially avoided in the coating solution.

In accordance with one embodiment of the present method, a nanocomposite material is made by generating inorganic nanoparticles in-situ within a polymer matrix as follows:

(a) forming a coating solution of a nanoparticle precursor and polymer dissolved in a substantially non-aqueous carrier liquid, comprising one or more organic solvents, wherein the nanoparticle precursor is a condensation polymerizable reactive metal compound comprising a metallic atom and at least two hydrolyzable leaving groups, and wherein the components of the coating solution are selected such that the nanoparticle precursor is essentially stable and unreacted prior to applying the coating solution onto a substrate to form a film;

(b) applying the coating solution onto a substrate to form a liquid-fluid coating and then removing organic solvent from the coating to form a gel;

(c) converting the nanoparticle precursor, by hydrolysis and polycondensation reactions, into nanoparticles in a matrix of the polymer to form a nanocomposite; and (d) drying the nanocomposite to remove remaining organic solvent from the nanocomposite (during which further condensation reaction may occur), wherein the nanocomposite, in the final product, is characterized by the presence of nanoparticles predominantly having a maximum dimension of not more than 50 nm, preferably at a concentration of more than 2.0 percent by weight of the nanoparticulate condensation product in the nanocomposite.

Without wishing to be bound by theory, it is believed that the formation of such nanoparticles is obtained by substantially delaying their formation until a gel of the polymer material is formed, after the organic solvent is evaporated to some extent, while the nanoparticle precursor is homogenously mixed in a matrix of the polymer. By slowing its diffusion in the gel, the polycondensation product is prevented from aggregating into larger particles. Reaction of the nanoparticle precursor or an intermediate product, and especially nanoparticle formation, should be avoided before coating, preferably before gelling. Similarly, it is preferred that nanoparticles greater than 5 nm, more preferably nanoparticles greater than 2 nm, are substantially absent from the coating solution prior to coating, more preferably prior to gelling of the coated solution.

Obtaining a homogenous mixture of the nanoparticles and delaying their formation and/or aggregation in the film can be achieved or promoted by a variety of factors, such as the use of (1) a relatively less reactive precursor, (2) a polymer more interactive or compatible with the precursor or intermediate during nanoparticle formation, (3) a more favorable solvent as described below, and/or (4) an alcohol to prevent or limit premature hydrolysis. Avoiding (or limiting) the use of a catalyst can also be a factor in obtaining the present nanocomposite, particularly with more reactive precursors. Another factor that can be used to obtain the present nanocomposite is controlling (or limiting) the presence of water necessary for the hydrolysis of the precursor. For example, reaction can be delayed by strictly excluding water from the coating solution and, instead, introducing water into the coated film by employing ambient humidity, as explained below. The ratio of water to precursor can affect the speed or timing of nanoparticulate formation.

Undesirable reaction or nanoparticle formation, not sufficiently delayed, may be evidenced by relatively larger particle size of the nanoparticles and, in the case of coating on a moving web, by elongation of the nanoparticles in the direction of web movement, indicating nanoparticles already substantially formed in the coating solution when applied to the moving web.

Because of their highly reactive nature, transition metal alkoxides and the like can undergo hydrolysis with the assist of gaseous water (moisture), and without a catalyst or catalysts. In one preferred embodiment, the nanoparticle precursors used in the present method, after coating a homogenous mixture thereof on a substrate, are subjected to a hydrolysis reaction that is carried out employing ambient humidity to provide the water necessary for hydrolysis in the coating. Accordingly, the water necessary for hydrolysis is preferably not contained in the coating solution prior to coating. The hydrolysis fosters the conversion of the nanoparticle precursor to a nanoparticle intermediate. A further condensation reaction produces the nanocomposite material. As will become clearer as the present description continues, the hydrolysis and condensation reactions do not necessarily occur sequentially, but rather may occur substantially simultaneously.

Preferably, the coating solution used to form the reaction mixture for the nanocomposite comprises the nanoparticle precursor in an amount of at least 5 weight percent relative to the total polymer, preferably in an amount of 6 to 33 weight percent. Typically, the coating solution is applied to a substrate by curtain coating, casting or other conventional or known techniques to form a nanocomposite material. The term "coating" is used in a generic sense to all these methods for making a thin film of the coating solution.

The present method further includes removing solvent after applying the coating solution to a substrate, which may be a moving web. Illustratively, the removal of the solvent occurs substantially continuously after forming a film of the coating solution, in accordance with a preferred embodiment. However, the removal of the solvent, after forming the solution, may occur either substantially continuously or in discrete steps or stages. Optionally solvent may be partially removed prior to forming the film, as long as the gel point of the coating solution is not reached before forming the film.

The solvent is preferably removed relatively rapidly, so that the gel point is reached before substantial reaction or aggregation of the precursor in the coating. Relatively rapid removal of the solvent, thus, helps to produce and substantially preserve the homogenous dispersion of the particles that are formed.

Hydrolysis and condensation are effected during the removal of solvent from the coating solution. Preferably, inappreciable, if any, hydrolysis or condensation is effected in the solution before a sufficient amount of solvent is removed to create a gel mixture. Accordingly, the bulk of the hydrolysis and condensation preferably occurs when the solvent-depleted solution is in the gel form. (As indicated above, the hydrolysis and condensation, although sometimes described as sequential steps or reactions, are usually concurrent to some extent.)

In a preferred embodiment, the nanoparticle precursor is reacted in the absence of a catalyst. Catalysts are to be avoided when the nanoparticles precursor is a very reactive organometallic compound. However, for relatively less reactive nanoparticle precursor compounds, an effective amount of catalyst can be added to the coating solution, although it may still be desirable to exclude water from the coating solution, so that the nanoparticle formation is delayed until after a gel is obtained.

Catalyst refers to a chemical compound that changes the reaction kinetics in the formation of the nanoparticles. For example, catalysts may include an acid or base compound. More specifically, catalysts may include acetic acid, HCl, nitric acid, KOH, amines and others known to those skilled in the art.

The addition of amounts of liquid water directly to the coating solution should be avoided with respect to the preferred nanoparticles precursors, in order to prevent premature conversion to nanoparticles. Preferably, the total amount of water necessary for hydrolysis of the nanoparticle precursor has not been added to the coating solution prior to coating. More preferably, the water is preferably added to the coating in sufficiently small or trace amounts after a gel containing the dispersed precursor has formed. Water should be carefully controlled, however, because it acts not only as a reactant for hydrolysis, but also as an initiator. Water is also by-product of the condensation.

As mentioned above, a preferred method for controlling hydrolysis of the nanoparticle precursor in the coating solution is to add water for hydrolysis from controlled humidity in the environment, which water can be drawn into the gel either through vapor diffusion or condensation at the surface of the coated solution where solvent is being evaporated.

By using humidity as a source of water for hydrolysis, the coating solution can comprises less than 25 weight percent, relative to the nanoparticle precursor, of water, preferably less than 10 weight %. (In contrast, US Patent No. 2004/004127 to Okubo et al., in Example 1, employs 45%, although 0.2% based on total solution in view of the low amount of nanoparticle precursor and resulting nanoparticles.)

In one preferred embodiment, in which the nanoparticle precursor is a transition metal alkoxide, the moisture content of the environment is suitably in the range of about 1.0% relative humidity (RH) to about 80.0% RH. In one particular embodiment, the relative humidity is about 5.0% to about 50.0% RH.

In any case, the addition of water, in any form (liquid or humidity), to generate nanoparticles, or a gel thereof, before the nanoparticle precursor is homogenously dispersed in the polymer matrix of the solution should be avoided. As mentioned above, the nanoparticle precursor and/or intermediate thereof are preferably in a gel of the polymer matrix before substantial conversion to the nanoparticles occurs.

The hydrolyzed precursor becomes more hydrophilic as it is hydrolyzed and tends to clump together away from the relatively hydrophobic polymer. Although the hydrolysis is very fast, the diffusion of the hydrolyzed precursor or intermediate in the solution is very slow when a gel is formed, thereby maintaining dispersion of the particle precursor or intermediate in the polymer matrix of the gel, prior to conversion into nanoparticles. The nanoparticles that are formed are, thereby prevented from aggregating too much.

A gel point is reached in the coated solution (i.e., liquid coating prior to solidification) due to the polymer forming tangled chains as solvent is evaporated. The viscosity of the solution is increased by polymer chain entanglement before the precursor is extensively converted to particles, thereby limiting or slowing diffusion of the nanoparticle precursor or intermediates. Diffusion of the nanoparticle precursor or intermediates can also limited by gelation in which the metal alkoxide or other type of precursor reacts to form a three dimensional structure that prevents flow. However, an extended chain cluster of the precursor is preferably limited prior to gel formation by polymer entanglement, since otherwise the polymer may coil back due to incompatibility of the cluster with the precursor.

A gel is characterized by a physical integrity and a viscosity above $10^6$ cp at an oscillating frequency of $1\ s^{-1}$ using a dynamic rheometer.

As mentioned above, another aspect of the present invention relates to a nanocomposite film comprising nanoparticles dispersed in a polymer matrix, which nanoparticles are the product of a condensation polymerizable reactive metal oxide compound, comprising a metallic atom and at least two hydrolyzable leaving groups. The nanocomposite is characterized by the presence of nanoparticles having an average maximum dimension of not more than 50 nm, preferably at a concentration of more than 2.0 percent by weight of the nanoparticulate condensation product in the nanocomposite, as evident by transmission electron microscopy (TEM). (The concentration of the nanoparticles can be determined according to thermal gravimetric analysis, or less approximately on a theoretical basis assuming 100 percent yield of the precursor).

The nanocomposite according to the present invention is also characterized, as determined by electron transmission microscopy, by nanoparticles having an average equivalent diameter of not more than 50 nm. Nanoparticles having a smallest dimension of more than 50 nm are substantially absent or relatively uncharacteristic of the nanoparticles, as determined by transmission electron microscopy.

The nanoparticles according to the present invention can be characterized either by distinct boundaries or by nanoparticles in the form of nano-regions, showing dark contrast and indistinct boundaries or varying degree (depending on the resolution) in a TEM micrograph.

Since the nanoparticle may have a different (usually darker) electron density than the matrix of the polymer, a density gradient can form and less distinct boundaries for the nanoparticles or nano-regions can result. Separate nano-regions can occasionally appear to blend into each other, although the nanocomposite substantially comprises nanoparticles that are individually or separately dispersed.

Without wishing to be bound by theory, less distinct nanoparticles or cloudy nano-regions in the nanocomposite may be very fine particles under 5 nm, more probably under 2 nm, that may have flocculated but have not fully condensed or aggregated to larger or particles that are more distinctly bounded. The interface of the nanoparticle and the matrix of the polymer, as defined by the electron density contrast can be either abrupt or gradual. In the case of abrupt electron density change, there is a sharper interface and a traveling electromagnetic wave experiences two different media; while in the case of gradual electron density change, the interface can be more subtle, and the traveling electromagnetic wave experiences more continuous alternation such that, for example, the scattering due to the change in refractive index can be reduced. Thus, in certain embodiments, it is beneficial that the electron density contrast is more gradual, particularly for relatively larger nanoparticles.

The nanoparticle precursor used to make the present nanocomposite may be a metal alkoxide, metal acetate, metal acetylacetonate, or halogenated metal. Preferably, however, the precursor is an organometallic compound.

In accordance with one preferred embodiment, the metal atom in the nanoparticle precursor is a transition metal. The transition metal may be Ti, Ta, Zr, Zn, Ta, Hf, Cr, V and W. Alkaline-earth metals, rare-earth metals and Group 3B, 4B and 5B metals are also useful. For example, the metal may be a non-transition metal such as Al, Tl, Sn, Sb, Ba, In, Pb and Ge. Barium, a Group 2A metal, may also be used. (Metals are defined to include elements that are electrically conductive in the pure state and do not include elements that form semiconductors or insulators such as silicon.) Preferred metals are aluminum, indium, tin, titanium, zirconium, and hafnium. The nanoparticles in the present nanocomposite, resulting from the reaction of such nanoparticle precursors, are substantially comprise the corresponding oxides of these metals, as will be readily understood by the skilled artisan.

Preferably, nanoparticle precursors comprising silicon instead of a metallic atom are substantially absent from the coating solution used to make the nanocomposite.

Illustratively, ligands or groups that are hydrolyzed include alkoxide, acetate, and halogen. Preferably, the leaving or hydrolyzable groups in the precursor compound contain three to six carbon atoms.

Illustratively, optional substituents that are not hydrolyzed include, for example, substituted or unsubstituted alkyl groups and substituted or unsubstituted aryl groups. The substituents of the alkyl group and the aryl group can include an alkyl group (for example, a methyl group, an ethyl group, etc.); a cycloalkyl group (for example, a cyclopentyl group, a cyclohexyl group, etc.); an aralkyl group (for example, a benzyl group, a phenyl group, etc.); an aryl group (for example, a phenyl group, a naphthyl group, etc.); a heterocyclic group (for example, a furanyl group, a thiophenyl group, a pyridyl group, etc.); an alkoxy group (for example, a methoxy group, an ethoxy group, etc.); an aryloxy group (for example, a phenoxy group, etc.); an acyl group; a halogen atom; a cyano group; an amino group; an alkylthio group; a glycidyl group; a glycidoxy group; a vinyl group; a fluorine-containing alkyl group; and a fluorine-containing aryl group.

For example, titanium-containing compounds useful as a nanoparticle precursor include titanium methoxide, titanium ethoxide, titanium isopropoxide, titanium-n-butoxide, tetrachlorotitanium, titanium diisopropoxide(bis-2,4-pentanedionate), titanium diisopropoxide(bis-2,4-ethylacetoacetate), titanium di-n-butoxide(bis-2,4-pentanedionate), titanium acetylacetonate, titanium lactate, titanium triethanolaminate, and a butyltitanium dimer.

Examples of a zirconium-containing compounds useful as a nanoparticle precursor include zirconium ethoxide, zirconium isopropoxide, zirconium n-propoxide, zirconium-n-butoxide, zirconium tri-n-butoxide acetylacetonate, zirconium tri-n-butoxide bisacetylacetonate, zirconium acetylacetonate, zirconium tetraiodide and zirconium acetate.

Examples of an aluminum-containing compound useful as a nanoparticle precursor include aluminum ethoxide, aluminum isopropoxide, aluminum-n-butoxide, aluminum-s-butoxide, aluminum-di-s-butoxide acetylacetonate, aluminum-t-butoxide, alumatrane, aluminum phenoxide, aluminum acetylacetonate, and aluminum ethylacetylacetonate.

Examples of other metal-containing compounds useful as nanoparticle precursors include barium isopropoxide, calcium ethoxide, copper ethoxide, magnesium ethoxide, manganese methoxide, strontium isopropoxide, tin ethoxide, zinc methoxyethoxide, trimethoxyborane, triethoxyborane, antimony ethoxide, arsenic triethoxide, bismuth t-pentoxide, chromium isopropoxide, erbium methoxyethoxide, gallium ethoxide, indium methoxyethoxide, iron ethoxide, lanthanum isopropoxide, neodymium methoxyethoxide, praseodymium methoxyethoxide, samarium isopropoxide, vanadium tri-isobutoxide, yttrium isopropoxide, tetramethoxygermane, tetraethoxygermane, tetraisopropoxygermane, tetra-n-butoxygermane, cerium t-butoxide, hafnium ethoxide, hafnium-n-butoxide, tellurium ethoxide, molybdenum ethoxide, niobium ethoxide, niobium-n-butoxide, tantalum methoxide, tantalum ethoxide, tantalum-n-butoxide, tungsten (V) ethoxide, tungsten (VI) ethoxide, and tungsten (VI) phenoxide.

Two or more kinds of precursors, for example different metal alkoxides, may be added to the coating solution used to make the present nanocomposites, within the content range described above. In addition, the nanoparticle precursor may be a double metal alkoxide that has two metal atoms in the molecule. Examples of the double metal alkoxide include aluminum copper alkoxide, aluminum titanium alkoxide, aluminum yttrium alkoxide, aluminum zirconium alkoxide, barium titanium alkoxide, barium yttrium alkoxide, barium zirconium alkoxide, indium tin alkoxide, lithium nickel alkoxide, lithium niobium alkoxide, lithium tantalum alkoxide, magnesium aluminum alkoxide, magnesium titanium alkoxide, magnesium zirconium alkoxide, strontium titanium alkoxide, and strontium zirconium alkoxide. The double metal alkoxide is preferably one having a metal selected from the group consisting of aluminum, titanium and zirconium. In accordance with the present invention, after the in-situ processing, a nanocomposite can be formed that optionally includes double metal oxide nanoparticles (e.g., barium titanium oxide nanoparticles). The nanoparticle precursor is selected to be compatible with the polymer. The compatibility of the inorganic-particle precursor fosters its interaction with, or bonding to, the polymer or its residing within the matrix of the polymer, as described further below.

Metal oxide nanoparticles are formed from the precursor by hydrolysis and condensation reactions in which a hydrogenated leaving group is a removable product from the reaction between hydrolyzed nanoparticle intermediates. The initial condensation can occur simultaneously with the hydrolysis. Final condensation preferably occurs with the evaporation of the solvent by heating. The final condensation may be completed even after the completion of the removal/drying of the solvent. Further heat treatment can be optionally employed to anneal the final nanoparticles. The amount of water in the material, the temperature, and the solvent all affect the kinetics of the condensation. Certain illustrative process parameters are provided in the Examples below.

At the completion of the condensation step, the nanoparticle may include hydroxyl surface groups, or ligand surface groups, or both. Solid state NMR can be used to determine the amount of such surface groups. Compared to prior-art nanoparticles made by laser ablation or other high temperature processes, the present nanoparticles have higher amounts of such surface groups, for example, unreacted leaving groups.

More specifically, hydrolysis is an exchange reaction that produces a nanoparticle intermediate comprising the metal with one or more hydroxide groups bonded thereto. The resulting nanoparticle intermediate may be an association of molecules surrounded by a polymer matrix. Both hydroxyl groups and ligand groups may be present in the intermediate. A condensation reaction occurs when hydroxy groups in the nanocomposite intermediate react.

In one preferred embodiment, the nanoparticle precursor is an organometallic material, for example, a metal alkoxide given by the formula:

$$R^1_y M(OR)_x \qquad (1)$$

wherein M is a metal, n is the valence of the metal M, which is typically 2 to 5, preferably 3 or 4; x=2 to n and y=0 to n-x; and R and $R^1$ are each independently selected organic substituents. In one preferred embodiment, the nanoparticle precursor is $R^1_y M(OR)_x$, where y=0 and x=4, that is, $M(OR)_4$. In one preferred embodiment, the precursor is a titanium alkoxide, more preferably, a titanium alkoxide in which the alkoxide has 3 to 6 carbon atoms.

In a preferred embodiment, all R groups are the same. In one particularly preferred embodiment x=2, 3, or 4 and y=0, 1, or 2. Preferred R groups are each independently alkyl or substituted alkyl having 1 to 12 carbon atoms. Preferred $R^1$ groups are substituted or unsubstituted alkyl, allyl, acrylate, and acetoacetate.

In one particularly preferred embodiment, involving a metallic alkoxide precursor, the reaction sequence for transforming nanoparticle precursor to nanoparticles can be schematically illustrated, in which a typical hydrolysis reaction is as follows:

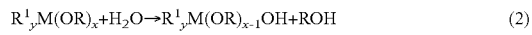

$$R^1_y M(OR)_x + H_2O \rightarrow R^1_y M(OR)_{x-1} OH + ROH \qquad (2)$$

Similarly, a typical condensation reaction is as follows:

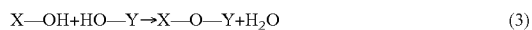

$$X-OH + HO-Y \rightarrow X-O-Y + H_2O \qquad (3)$$

wherein X and Y are independently reaction intermediates of the nanoparticle precursor, which may include the intermediate on the right side of equation (2) or condensation and/or hydrolysis products thereof. Thus, the compound or material X—O—Y can be in the form of a three dimensional network with OH, OR, or $R^1$ end groups.

This reaction sequence occurs in the presence of the polymer in the mixture, resulting in a nanocomposite of the nanoparticles in a polymer matrix, thereby forming a substantially homogeneous nanocomposite material structure.

Accordingly, the nanoparticle precursor undergoes hydrolysis in which one or more OR groups are converted to one or more OH groups, preferably at least two OH groups prior to condensation. This hydrolysis, thus, forms a nanoparticle intermediate that comprises one or more hydrolyzed metal alkoxides, a plurality of which can associate in the solution. Alcohol is formed as a reaction side product. The hydrolyzed metal alkoxide nanoparticle intermediate can then be condensed to form the nanoparticles. Metal hydroxides can initially form oligomers of metal oxides that eventually are built into the final nanoparticles.

In one preferred embodiment, the precursor is a titanium alkoxide, more preferably, a titanium alkoxide in which the alkoxide has 3 to 6 carbon atoms.

Preferably, the nanoparticles are also characterized by average aspect ratio less than 5. In certain embodiments, these nanoparticles have maximum dimensions in the range of about 1.0 to 50 nm, more preferably 20 to 40 nm. In optical applications of nanocomposite materials, it is often useful to have nanoparticles having no dimension greater than a fraction of the wavelength of light traversing the nanocomposite. To this end, nanoparticles of the ranges mentioned reduces scattering of light and benefits optical characteristics such as transparency.

Considerations when choosing the solvent for the coating solution include the solubility of the polymer in the solvent as well as the ability to stabilize the nanoparticle precursor to prevent premature reaction of the nanoparticle precursor and its intermediates. Such stabilization is particularly desirable in the case of metal alkoxide precursors, which may be very reactive, and especially transition metal alkoxides that are relatively highly reactive. The solvent can affect the kinetics of the hydrolysis and condensation reactions.

Since the metal oxide has a weaker affinity with polymer than the precursor, stabilization of the precursor and its intermediate prior to formation of gel is desirable to prevent agglomeration.

As such, the solvent is useful in preventing the nanoparticles in the nanocomposite from reaching unacceptable size and fostering the formation of nanoparticles of relatively smaller dimensions.

The solvent can be selected to provide the polymer with the desired solubility, for example, based on a measurable solubility parameter $\chi$. The term 'solubility parameter' refers to the polymer-solvent interaction parameter, $\chi$, which is defined in the following equation:

$$\Delta G_m = RT[n_1 \ln \phi_1 + n_2 \ln \phi_2 + n_1 \phi_2 \chi] \quad (5)$$

where: $\Delta G_m$ is the Gibbs energy of mixing; T is the temperature; R is a known constant; and subscripts 1 and 2 refer to the polymer and solvent, respectively; n is the molar fraction; and $\phi$ is the volume fraction. Notably, the lower the value of $\Delta G_m$, the more favorable the interaction is between the polymer and the solvent. Therefore, a lower $\chi$ represents a good interaction. Numerous techniques can be used to measure $\chi$ such as scattering, vapor pressure methods, and similar methods. The value of $\chi$ may also be calculated based on information from standard references known to the skilled artisan. Preferably, the solubility parameter is less than about 1.0.

The solvent used in the coating solution solvates or dissolves the polymer and the nanoparticle precursor. Preferably, the solvent provides a solution of the polymer in which the polymer chains can fully extend and, more preferably, in which the extended polymer chains can sufficiently interact with the inorganic particle precursor to contribute to the homogenous dispersion of the precursor and its intermediates.

The solvent can be one or more of a variety of known organic solvents. The solvent can be polar or nonpolar, depending on the other components of the coating solution. For example, polar solvents include alcohols, glycols, amides, ethers, ketones and halogenated organic solvent, whereas nonpolar solvents include benzene, xylene, and dioxane. Some solvents can be used possessing intermediate polarity such as THF and ethanol.

Examples of good solvents include ketones such as acetone, methyl ethyl ketone, cyclopentanone, and cyclohexanone; ethers such as tetrahydrofuran (THF), 1,4-dioxane, 1,3-dioxolane, and 1,2-dimethoxyethane; esters such as methyl formate, ethyl formate, methyl acetate, ethyl acetate, amyl acetate, and gamma-butyrolactone; methylcellosolve; dimethylimidazolinone; dimethylformamide; dimethylacetoamide; acetonitrile; dimethylsulfoxide; sulfolane; nitroethane; and methylene chloride. Preferred solvents include butanol, dimethylene chloride, benzene and THF. A mixture of solvents can be used.

Alcohols can be used to protect the ligand or leaving group of a transition metal alkoxide or other relatively reactive nanoparticle precursor, which precursors are reactive and prone to hydrolyze and polymerize. Such alcohols thereby can slow down the hydrolysis and condensation. In a preferred embodiment, the carrier liquid for the coating solution used to make the present nanocomposite comprises an organic solvent that is ethylene glycol or a compound having at least three carbon atoms and at least one hydroxy group, for example, butanol, isopropyl alcohol, or ethylene glycol. Such alcohols are preferably present in the coating solution in minor amounts in combination with one or more other organic solvents. Preferably, the carrier liquid is essentially free of methanol or ethanol, which tend to contain excessive amounts of water.

The concentration of the carrier liquid, or solvent, in the coating solution used to make the present nanocomposite is such that the polymer chain is uncoiled. The concentration of solvent in the coating solution is illustratively in the range of about 1% to about 50% by weight. More illustratively, the concentration is in the range of between about 2% to about 15% by weight.

The polymer (or matrix polymer) used to make the present nanocomposite may be either an addition polymer or a condensation polymer. The matrix polymer of the invention can be any natural or synthetic polymer. The matrix polymer of the invention can be of different architecture: linear, grafted, branch or hyperbranched. The matrix polymer may be a thermoplastic or a thermoset resin. Illustrative of useful thermoplastic resins are cellulose and its derivatives (cellulosic): cellulose ethers such as methyl cellulose, ethyl cellulose, hydroxyethyl cellulose, hydroxypropyl cellulose, and cyanoethyl cellulose, and cellulose esters such as triacetyl cellulose (TAC), diacetyl cellulose (DAC), cellulose acetate propionate (CAP), cellulose acetate butyrate (CAB), cellulose acetate phthalate, cellulose acetate trimellitate and cellulose nitrate. The polymer can include polyolefins such as (linear) low and high density poly(ethylene), poly(propylene), chlorinated low density poly(ethylene), poly(4-methyl-1-pentene), and poly(ethylene) and cyclic polyolefins; poly(styrene); polyxylyene; polyimide; vinyl polymers and their copolymers such as poly(vinylcarbazole), poly(vinyl acetate), poly(vinyl alcohol), poly(vinyl chloride), poly(vinyl butyral), poly(vinylidene chloride), ethylene-vinyl acetate copolymers, and the like; polyacrylics their copolymers such as poly(ethyl acrylate), poly(n-butyl acrylate), poly(methylmethacrylate), poly(ethyl methacrylate), poly(n-butyl methacrylate), poly (n-propyl methacrylate), poly(acrylamide), polyacrylonitrile, poly(acrylic acid), ethylene-acrylic acid copolymers; ethylene-vinyl alcohol copolymers; acrylonitrile copolymers; methyl methacrylate-styrene copolymers; ethylene-ethyl acrylate copolymers; methacrylated butadiene-styrene copolymers, and the like; polycarbonates such as poly(methane bis(4-phenyl)carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl)propane)carbonate and the like; polyether; polyketone; polyphenylene; polysulfide; polysulfone; polylactones such as poly(pivalolactone), poly(caprolactone) and the like; polyurethanes; linear long-chain diols such as poly(tetramethylene adipate), poly(ethylene adipate), poly(1,4-butylene adipate), poly(ethylene succinate), poly(2,3-butylenesuccinate), polyether diols and the like; polyether ether ketones; polyamides such as poly(4-amino butyric acid), poly (hexamethylene adipamide), poly(6-aminohexanoic acid), poly(m-xylylene adipamide), poly(p-xylyene sebacamide), poly(2,2,2-trimethyl hexamethylene terephthalamide), poly (metaphenylene isophthalamide) (NOMEX), poly(p-phenylene terephthalamide)(KEVLAR), and the like; polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate) (A-TELL), poly(para-hydroxy benzoate) (EKONOL), poly (1,4-cyclohexylidene dimethylene terephthalate) (KODEL) (cis), poly(1,4-cyclohexylidene dimethylene terephthalate) (KODEL) (trans), polyethylene terephthlate, polybutylene terephthalate and the like; poly(arylene oxides) such as poly (2,6-dimethyl-1,4-phenylene oxide), poly(2,6-diphenyl-1,4-phenylene oxide) and the like; poly(arylene sulfides) such as poly(phenylene sulfide) and the like; polyetherimides; ionomers; poly(epichlorohydrins); furan resins such as poly(furan); silicones such as poly(dimethyl siloxane), poly(dimethyl siloxane), poly(dimethyl siloxane co-phenylmethyl siloxane) and the like; polytetrafluoroethylene; and polyacetals. Copolymers and/or mixtures of these aforementioned polymers can also be used.

Vulcanizable and thermoplastic rubber materials may also be used as the polymer. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like, as for example the copolymers in poly(styrene)-poly(butadiene)-poly(styrene) block copolymer manufactured by Shell Chemical Company under the trade name of KRATON. Copolymers and/or mixtures of these aforementioned polymers can also be used.

Preferred matrix polymers include thermoplastic polymers such as vinyl, polystyrene, polyacrylic, and polyxylyene, polyvinylcarbazole, polyester, polyamide, polyimide, polycarbonate, polyether, polyketone, polyphenylene, polysulfide, polysulfone, and cyclic polyolefin.

The polymer used in the coating solution preferably has affinity to the surface of the nanoparticle precursor, nanoparticle intermediate, and/or nanoparticle product, which fosters a more thermodynamically favorable homogenous dispersion. The surface of the nanoparticle typically comprises —OH or ligand groups (for example, an OR group when using an alkoxide precursor), both of which are good electron donors. Thus, the presence of electron-acceptive functional groups on the polymer can provide or enhance affinity of the polymer to the surface of the nanoparticles, including hydrogen bonding. Functional groups in the polymer such as carbonyl, acid, amide and ester are known as strong acceptors of acidic hydrogen and can form hydrogen bonding with the OH groups of the nanoparticle intermediate. These groups can be present either in the backbone, side chain or the terminal end of the polymer, to compatibilize the nanoparticles or intermediate thereof with the polymer matrix.

Additionally, Van der Waals forces can enhance the affinity of the nanoparticles and polymer. Such interactions between the nanoparticles and polymer are believed to aid the homogenous dispersion of the polycondensation product and prevent undesirable agglomeration that can lead to larger particles that can adversely affect transparency of the nanocomposite, resulting in undesirable haze.

The compatibility of the nanoparticle precursor with the polymer can also derive from chemical bonding and coordination.

Reactive functional groups that can be present in the polymer chain to react with the nanoparticle precursor and nanoparticle intermediate, to form chemical bonding, include metal alkoxide functional groups represented by the following formula:

$$—C—M—R_x—OR'_y \qquad (6)$$

wherein M is Si or a metal atom selected from the group consisting of Si, Ti, Zr, and Sn; each R and R' are independently an organic moiety; x is 0, 1, 2 or 3, y is 1, 2, 3, or 4 and the sum of x and y is equal or less than 4. Such groups can react with the nanoparticle precursor or nanoparticle intermediate to form a chemical bonding. Other coupling chemistry can be used as well.

The nanoparticles may be useful in providing various desirable characteristics to the nanocomposite. The selection of the nanoparticle factors in the optical, electrical, and mechanical characteristics of the nanocomposite. For example, some transition metal oxides have a relatively high index of refraction, while many polymers do not. Therefore, the nanocomposite may have the desired characteristics of a film with a relatively high index of refraction. Commonly assigned copending application Ser. No. 11/208,564 (Docket No. 87290), hereby incorporated by reference, discloses compositions in which the index of refraction is above a certain minimum.

In applications where the resultant nanocomposite material is used in optical applications, a substantially homogeneous index of refraction is provided across substantially the full thickness of material for light of visible wavelengths. When a homogeneous dispersion is formed and the domain size is smaller than the visible light wavelength, the composite refractive index can be calculated through Lorenz-Lorenz relation, and written as:

$$n_c = V_1 n_1 + V_2 n_2 \qquad (4)$$

wherein "n" is refractive index, V is volume fraction, and the subscripts 1 and 2 refer to each of the individual components, while the subscript c refers to the nanocomposite material. In this way, higher refractive index materials for certain applications may be realized from polymer materials.

The barrier properties with respect to moisture, oxygen, and/or other environmental gases may also be altered to a desired end via the incorporation of nanoparticles.

Moreover, the metal oxide nanoparticle when homogeneously dispersed within the polymer may impart improved thermal, electrical, and/or mechanical properties compared to the polymer alone. For example, the mechanical properties of tensile strength and compressibility can be altered over those of the unfilled polymer, resulting in stronger and more durable materials compared to the polymer alone. Such nanocomposites can be used for structural, construction, and packaging applications.

Another optical property that can be controlled or increased by the presence of nanoparticles is birefringence.

The present invention can be used for making protective layers or films for polarizing films. The protective films according to the invention have improved dimensional stability, UV absorption, and optical properties. Polarizing films (also commonly called "polarizers") are widely used in display devices. For example, in Liquid Crystal Displays (LCDs), a liquid crystal (LC) cell is typically situated between a pair of polarizers. Randomly polarized light from a light source is incident on a first polarizer and emerges from the polarizer in a defined polarization state, often a linearly polarized state. The polarized light passes through the LC cell or light valve. Voltages are selectively applied across the picture elements (pixels) disposed in an array over the LC cell. In response to the applied voltage, the orientation of the molecules of the LC material at selected pixels is altered. In certain types of LC cells, as a result of this selectively applied voltage, the polarization state of the light incident on the LC cell is rotated and emerges from the LC cell in a polarization state that is orthogonal to that of the incident state. In other types of LC cells, the light emerges in its original polarization state.

In normally black (NB) LC cells, light that is incident normally (zero angle of incidence) to pixels where a suitable voltage is applied emerges in its original state of polarization. This light traverses a second polarizer, which has a transmission axis parallel to the first polarizer, and emerges as 'bright state' light. Contrastingly, light incident normally to the pixels where no voltage is applied is rotated to be orthogonal to its original direction upon emerging from the LC cell. The second polarizer absorbs the light.

In normally white (NW) LC cells, the first and second polarizers having transmission axes that are orthogonal (crossed) to one another. The orientation of these polarizers reverses the sense of light and dark state light compared to NB LC cells discussed above.

In either NB or NB LC cells, light from the light source is modulated to form images, with one polarization state providing the 'bright' state light (i.e., bright pixels) and the orthogonal polarization state providing the 'dark' state light (i.e., dark pixels). In either type of cell, polarizers are used to effect this modulation.

In addition to LCDs, other display devices incorporate polarizers for various functions. For example, organic light emitting diode (OLED) displays often include a combination of an optical retardation film and a polarizer, such as a circular polarizer, for ambient light rejection. In many display applications including LCD and OLED displays, it is important that the degree of polarization of the light through the polarizers is high. A low degree of polarization would result in inferior displays.

Most of the polarizers currently used in displays are linear transmission-absorptive polarizers. In particular, these polarizer transform incident unpolarized or randomly polarized into polarized light by absorbing a component of the electric field oscillating in direction orthogonal to the transmission axis and transmitting a component of the electric field oscillating in a direction parallel to the transmission axis. The light that emerges from the polarizer is linearly polarized.

Many absorption-dichromatic polarizing elements desirably function over a wide range of visible spectrum. Often, the polarizers are made of stretched sheets of polyvinyl alcohol (PVA) impregnated with iodine or organic dichroic dyes. In most cases the absorption axis is parallel to the direction of the stretching. Unfortunately, polarizing elements made from PVA sheets alone do not possess durability in actual use. Thus, they are sandwiched between two protective films, typically made from cellulose triacetate (CTA or TAC). The incident unpolarized light traverses the protective film, and is polarized through the polarizing element. The linearly polarized light emerges through the other protective film. It is desirable for the protective films to be highly transparent and birefringent. Moreover, it is desirable for the protective films to be dimensionally stable with respect to temperature and humidity; and to be chemically stable.

In addition to the demands placed on polarizers and their protective layers, there is an increasing demand for relatively thin display devices. For example, many displays are included in small and thin portable electronic equipment, such as mobile phones, personal digital assistants (PDAs), global positioning system (GPS) devices, hand-held video game machine and laptop computers, to mention only a few. As can be appreciated, the demands on these device places a demand for thinner polarizers. Currently, the standard thickness of is 80 µm and the typical polarizer thickness having protective sheets both sides of polarizing element is around 200 µm. In order to reduce the thickness, thinner TAC sheets become necessary. However, for thinner TAC protective sheets, several issues have to be addressed for practical application.

Usually, the TAC protective sheets are doped with UV absorbing dopant. This dopant protects the iodine or organic dichroic dyes in a polarizing element. Moreover, UV exposure can degrade the LC material by photo-chemical reactions. This is particularly true for chiral agents commonly used for twisted nematic or super twisted nematic LCDs. Photochemical reactions of a chiral agent can alter the twist state of the LCDs leading to malfunctions. TAC protective sheets have to absorb a certain amount of UV.

As the TAC protective sheets are desirably thinner for many applications, the sheets will require a higher concentration of UV absorbing dopant. Usually, low molecular weight UV absorbing dopants, such as benzotriazole or benzophenone compounds are used. Due to the low solvability of UV absorbing dopants, TAC protective sheets having high concentrations of dopants are prone to the problems such as precipitation at the surface, haze and contamination of the polarizer manufacturing equipment. Also, high concentrations of UV absorbing dopants tend to color the film, thereby degrading the color integrity of the image on the LCD or the OLED display.

Another aspect of known thin TAC films is the lack of out-of-plane phase retardation. Image quality in LCDs is viewing angle dependent. When viewed directly at a normal or on-axis viewing angle (0° vertical, 0° horizontal viewing angle) LCDs provide their best quality image, with the greatest contrast. However, as the viewing angle deviates from on-axis (i.e., higher viewing angles), the contrast ratios of known LCDs decreases, and the image quality degrades. This occurs due to the optically anisotropic or birefringent effect exhibited by the LC layer, which includes anisotropic LC molecules. The off-axis light thus propagates in two modes, which have a relative phase delay. The phase delay increases with increasing angle of incidence and thus viewing angle.

This phase delay can transform desirably linearly polarized light into elliptically polarized light. Thereby, the desirable selectivity of linearly polarized states is lost in the off-axis, and the contrast ratio of bright state light to dark state light is compromised.

In an attempt to mitigate the off-axis optical anisotropy, compensating retarders may be used. These retarders introduce out-of-plane phase retardation. To this end, the out-of-plane birefringence is defined as the difference between the index of refraction along an axis perpendicular to the plane of the retarder (e.g., $n_z$) and the average of the indices of refraction in the plane of the retarder (e.g., $n_x$ and $n_y$). Thus, the out-of-plane retardation, $R_{th}$, is in the direction of the thickness of the LC cell and equals:

$$R_{th} = n_z - [(n_x + n_x)/2] \cdot d$$

where d is the thickness of the layer. As such, by introducing a selected amount of out-of-plane retardation, compensation for the off-axis anisotropy may be garnered.

As can be appreciated, the value of $R_{th}$ is proportional to the film thickness. Accordingly, as the thickness of components if desirably reduced, the so is the amount of out-of-plane birefringence that can be achieved with a compensator. For example, TAC provides negative out-of-plane birefringence. Layers of TAC have a thickness of approximately 80 μm, providing a retardance (Rth) of approximately −50 nm. By reducing the thickness of TAC to 30 cm, Rth would only be −19 nm, a value that is optically not sufficient for partial correction of off-axis contrast ratio reduction.

In addition to the shortcomings described above, known polarizer protective layer can suffer from low dimensional stability. Dimensional instability degrades the polarizer performance mainly by two mechanisms: photo elasticity and change in the local polarization direction. Due to the photo elasticity, a protective sheet generates undesired birefringence as it shrinks or expands due to temperature or humidity. With this photo elastic induced birefringence in the protective film, the linearly polarized light generated by the polarizing element will be altered to elliptically polarized light while it traverses the protective film. In most cases, such a birefringence caused by photo elasticity is not uniform across the plane of the polarizer and thus creates an inhomogeneous brightness in the display. Even if the protective film has no photo elasticity, dimensional variance can alter the local polarization direction of the protective sheet.

Nanocomposites, and methods of fabricating the same, according to the present invention can be used to provide polarizer protective nanocomposite films or sheets that exhibit improved dimensional stability under high temperature/humidity as well as overcoming other shortcomings of known protective sheets. Polarizer protective films are generally low birefringence polymer films that comprise polymeric materials having low Intrinsic Birefringence $\Delta n_{int}$ that form high clarity films with high light transmission (i.e., >85%). Preferably, the low birefringence polymer film has in-plane birefringence, $\Delta n_{in}$ of less than about $1 \times 10^{-4}$ and an out-of-plane birefringence, $\Delta n_{th}$ of from 0.005 to −0.005. Exemplary polymeric materials for use in the low birefringence polymer nanocomposite films of the invention include cellulose esters (including triacetyl cellulose (TAC), cellulose diacetate, cellulose acetate butyrate, cellulose acetate propionate), polycarbonates (such as LEXAN available from General Electric Corp.), polysulfones (such as UDEL available from Amoco Performance Products Inc.), polyacrylates, and cyclic olefin polymers (such as ARTON available from JSR Corp., ZEONEX and ZEONOR available from Nippon Zeon, TOPAS supplied by Ticona), among others. Preferably, the low birefringence polymer nanocomposite film (substrate in the multilayer optical nanocomposite film) comprises TAC, polycarbonate, or cyclic olefin polymers due their commercial availability and excellent optical properties.

The low birefringence polymer nanocomposite film can have a thickness from about 5 to 100 micrometers, preferably from about 5 to 50 micrometers, and most preferably from about 10 to 40 micrometers.

As used herein, the terms "polarizer protective layer," "cover sheet," and "low birefringence polymer films" are all used interchangeably and include "layers," "films," or "sheets," also interchangeable terms, useful in polarizer plates.

In one embodiment of the nanocomposite film according to the present invention, which film is capable of use as a polarizer protective nanocomposite film, the film comprises a low birefringence polymer in which the nanoparticles raise the birefringence of the polymer by at least 10 percent, the film has an out-of-plane birefringence in the range of approximately −0.02 to approximately −0.002, and the nanoparticles increase the absorption of ultraviolet (UV) radiation in the range of approximately 300 to 400 nm to m over 10 percent at the maximum absorption.

Such a nanocomposite film according to the present invention are useful in liquid crystal displays. Liquid crystal displays typically employ two polarizer plates, one on each side of the liquid crystal cell. Each polarizer plate, in turn, employs two cover sheets, one on each side of the PVA-dichroic film. Each cover sheet may have one or more of various auxiliary layers, thereby forming multilayer optical films according to the present invention that are used in the fabrication of polarizer plates and are useful for improving the performance of the Liquid Crystal Display. Suitable auxiliary functional layers for use in the multilayer films of the present invention include, for example, an anti-reflective film, abrasion resistant hardcoat layer, antiglare layer, anti-smudge layer, stain-resistant layer, low reflection layer, antistatic layer, viewing angle compensation layer, and moisture barrier layer. Optionally, a cover sheet composite can also comprises a strippable, protection layer on the topside of the cover sheet.

In one embodiment of the present invention, a cover sheet can, for example, comprise a composite sheet comprising an optional carrier substrate, a low birefringence protective film that is a nanocomposite according to the present invention, a layer promoting adhesion to PVA, and at least one auxiliary (functional) layers, on the same side of said carrier substrate as the low birefringence polymer nanocomposite film.

Typically, the cover sheet closest to the viewer contains one or more of the following auxiliary layers: an abrasion resistant layer, anti-smudge or stain-resistant layer, anti-reflection layer, and antiglare layer. One or both of the cover sheets closest to the liquid crystal cell typically contain a viewing angle compensation layer. Any or all of the four cover sheets typically employed in the LCD may optionally contain an antistatic layer and a moisture barrier layer.

In one particular embodiment, a cover sheet composite contains an antiglare layer in addition to an anti-reflection layer. Preferably, the antiglare layer and anti-reflection layer are located on the front side of the low birefringence protective film opposite to the polarizing film in a polarizer plate. An antiglare coating provides a roughened or textured surface that is used to reduce specular reflection. All of the unwanted reflected light is still present, but it is scattered rather than specularly reflected. In another embodiment, an anti-reflection layer according to the present invention is used in combination with an abrasion resistant hard coat layer and/or antiglare layer. The anti-reflection coating is typically applied on top of the antiglare layer or abrasion resistant layer or both.

Figure 6:
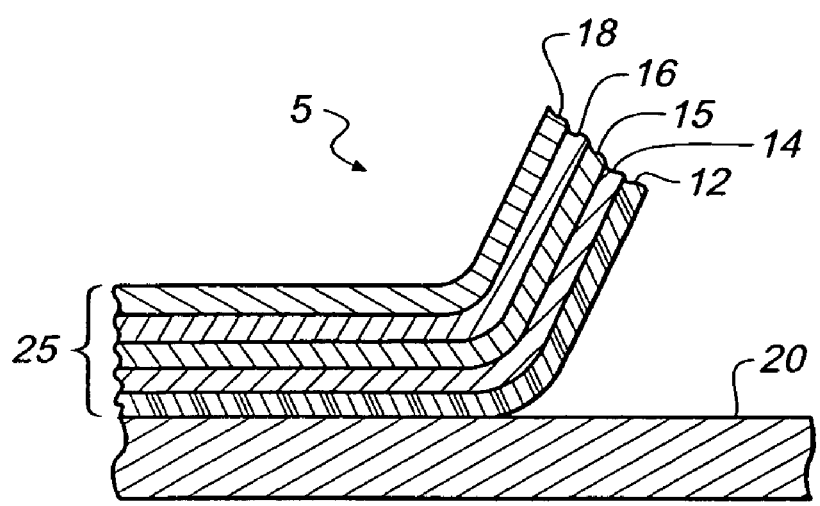
FIG. 6 is an embodiment of a cover sheet or multicomponent film comprising a polarizer protective nanocomposite film according to the present invention.

For example, FIG. 6 shows one embodiment of a cover sheet composite 5 comprising cover sheet 25 that is comprised of a lowermost layer 12 nearest to a carrier substrate 20, three intermediate functional layers 14, 15, and 16, and an uppermost layer 18, being peeled from the carrier substrate 20 prior to adhesion to a polarizing film in the manufacture of a polarizing plate. In this illustration, layer 12 is a layer promoting adhesion to the poly(vinyl alcohol)-containing polarizing film, layer 14 is a low birefringence protective film that is a nanocomposite according to the present invention, layer 15 is a moisture barrier layer, layer 16 is an antiglare layer, and layer 18 is an anti-reflection layer.

The auxiliary layers can be applied by any of a number of well known liquid coating techniques, such as dip coating, rod coating, blade coating, air knife coating, gravure coating, microgravure coating, reverse roll coating, slot coating, extrusion coating, slide coating, curtain coating, or by vacuum deposition techniques. In the case of liquid coating, the wet layer is generally dried by simple evaporation, which may be accelerated by known techniques such as convection heating. The auxiliary layer may be applied simultaneously with other layers such as subbing layers and the low birefringence polymer nanocomposite film. Several different auxiliary layers may be coated simultaneously using slide coating, for example, an antistatic layer may be coated simultaneously with a moisture barrier layer or a moisture barrier layer may be coated simultaneously with a viewing angle compensation layer. Known coating and drying methods are described in further detail in Research Disclosure 308119, Published December 1989, pp. 1007 to 1008.

As indicated above, the multilayer optical nanocomposite films of the present invention are useful as cover sheets with a wide variety of LCD display modes, for example, Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. Nos. 5,619,352 (Koch et al.), 5,410,422 (Bos), and 4,701,028 (Clerc et al.).

Figure 7:
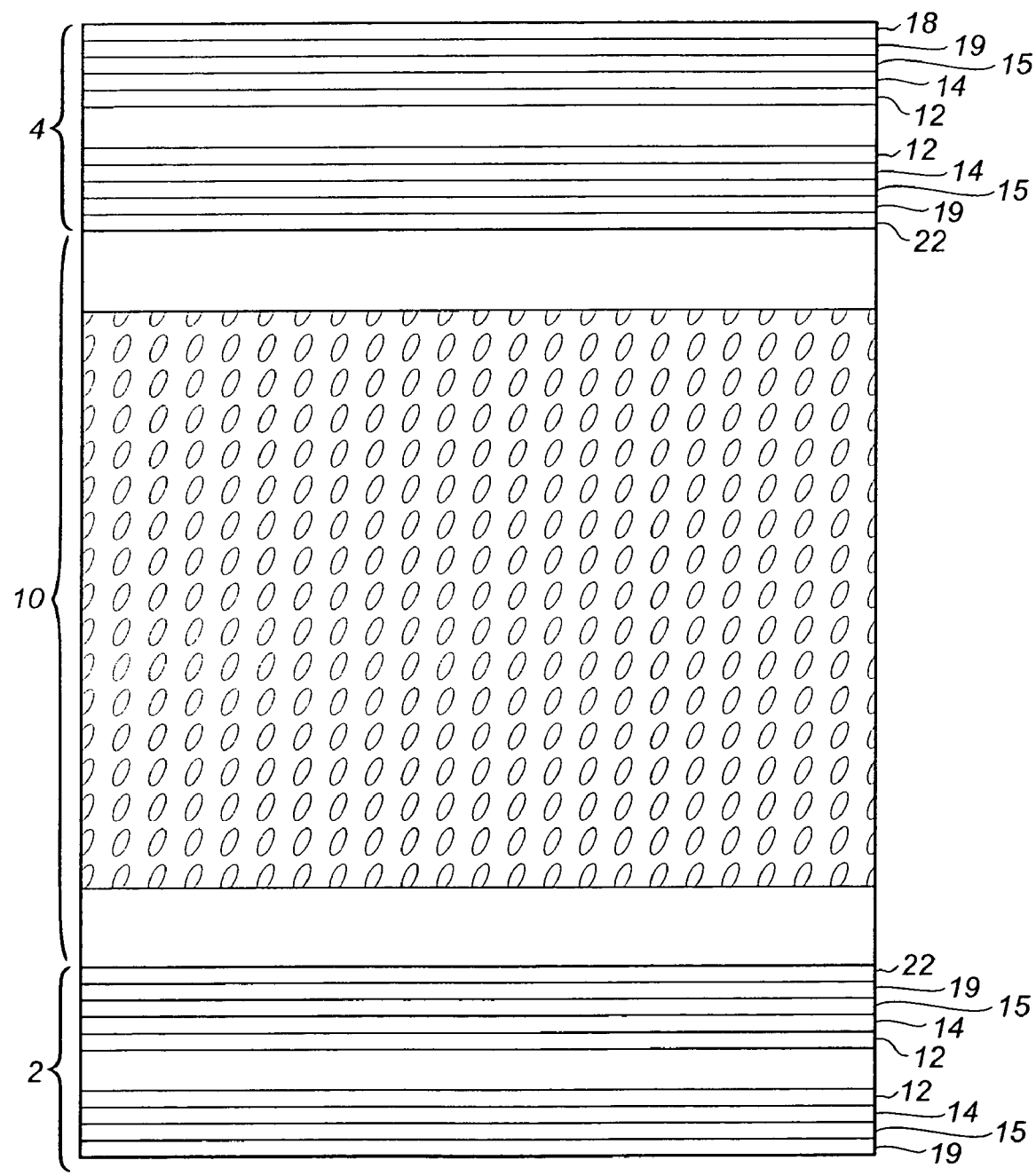
FIG. 7 is a cross-sectional illustration showing a liquid crystal cell having polarizer plates comprising a nanocomposite film in accordance with the present invention.

As should be obvious based on the preceding detailed description, a wide variety of guarded cover sheet composites having various types and arrangements of auxiliary layers may be prepared. Some of the configurations possible in accordance with the present invention are illustrated in U.S. Ser. No. 10/838,841 and 11/028,036 (docket 88085), hereby incorporated by reference. The latter application also discloses a method to fabricate a polarizer plate from guarded cover sheet composites, in which the cover sheet is laminated to the PVA dichroic polarizing film such that the layer promoting adhesion to PVA is on the side of the cover sheet that contacts the PVA dichroic film. A glue solution may be used for laminating the cover nanocomposite film and the PVA dichroic film FIG. 7 presents a cross-sectional illustration showing a liquid crystal display cell 10 having rear and front polarizer plates 2 and 4, respectively, disposed on either side. Polarizer plate 4 is on the side of the LCD cell closest to the viewer. Each polarizer plate employs two cover sheets. For the purpose of illustration, polarizer plate 4 is shown with an uppermost cover sheet (this is the cover sheet closest to the viewer) comprising a layer promoting adhesion (to PVA) 12, low birefringence protective film 14 that is a nanocomposite according to the present invention, moisture barrier layer 15, antistatic layer 19, and anti-reflection layer 18. The lowermost cover sheet contained in polarizer plate 4 comprises a layer promoting adhesion to PVA 12, low birefringence polymer nanocomposite film 14, moisture barrier layer 15, antistatic layer 19, and viewing angle compensation layer 22. On the opposite side of the LCD cell, polarizer plate 2 is shown with an uppermost cover sheet, which for the purpose of illustration, comprises a layer promoting adhesion (to PVA) 12, low birefringence protective film 14, moisture barrier layer 15, antistatic layer 19, and viewing angle compensation layer 22. Polarizer plate 2 also has a lowermost cover sheet comprising a layer promoting adhesion to PVA 12, low birefringence polymer nanocomposite film 14, moisture barrier layer 15, and antistatic layer 19.

In one embodiment of the present invention, a nanocomposite according to the present invention is used as a polarizer protective film, wherein the film has an out-of-plane birefringence in the range of approximately −0.02 to approximately −0.002, preferably without a plasticizer.

In accordance with another embodiment, a liquid crystal display (LCD) device includes a liquid crystal (LC) cell; a front polarizer having a first polarizer protective film disposed over at least one side; and a rear polarizer having a second polarizer protective layer disposed over at least one side. At least one, preferably both, of the first and second polarizer protective layers each include a nanocomposite material according to the present invention, wherein the nanocomposite material has an out-of-plane birefringence in the range of approximately −0.02 to approximately −0.002, preferably without a plasticizer.

Typically, a polarizing plate includes a first polarizer protective nanocomposite layer, a polarizer and optionally, a second polarizer protective nanocomposite layer. The polarizer is illustratively a linear (uniaxial) polarizer, which may be susceptible to degradation from ultraviolet (UV) radiation. For example, the polarizer may be a sheet of doped material, where the optical properties of the dopant degrade from exposure to UV radiation. Illustratively, the polarizer is PVA impregnated with iodine or organic dichroic dyes.

Particularly preferred polymers for the protective nanocomposite film are cellulose and its derivatives (cellulosic): cellulose ethers such as methyl cellulose, ethyl cellulose, hydroxyethyl cellulose, hydroxypropyl cellulose, and cyanoethyl cellulose, and cellulose esters such as triacetyl cellulose (TAC), diacetyl cellulose (DAC), cellulose acetate propionate (CAP), cellulose acetate butyrate (CAB), cellulose acetate phthalate, cellulose acetate trimellitate and cellulose nitrate. The cellulose esters are most preferred.

The metal oxide materials for the nanoparticles of the polarizer protective nanocomposite layers are chosen to provide certain beneficial characteristics to the nanocomposite material. In a specific embodiment, the nanoparticles of the polarizer protective layers substantially entirely absorb light in the UV spectrum, provide a negative out-of-plane birefringence $(n_z-[(n_x+n_x)/2])$ and are substantially dimensionally stable over a temperature range. Moreover, the nanoparticles provide these benefits to the polarizer protective layer, which has a thickness of approximately 10 μm to approximately 200 μm. In a specific embodiment, the layer has a thickness in the range of approximately 20 μm to approximately 50 μm.

As described in greater detail herein, the nanoparticles of the nanocomposite material of the polarizer protective layer preferably include metal oxide nanoparticles of titanium oxide ($TiO_2$), or zirconium oxide ($ZrO_2$), zinc oxide (ZnO), or aluminum oxide. These metal oxides are chosen for their desired properties of UV absorption, negative out-of-plane birefringence $(n_z-[(n_x+n_x)/2])$ and dimensional stability over a temperature range in a polarizer protective nanocomposite layer having a thickness in the noted range. As detailed more fully herein, the magnitude of the referenced properties depends on the degree of loading of the nanoparticles in the nanocomposite layer. In keeping with the method of the present application, these nanoparticles are formed in-situ from suitable nanoparticle precursors of the mentioned oxide materials, as described above, for example, zinc methoxyethoxide to produce ZnO.

In addition to the beneficial properties provided to the polarizer protective nanocomposite layers by the nanoparticles referenced above, and as described above, the metal oxide nanoparticles of the present invention are characterized by dimensions such that the nanoparticles do not act as scattering sites at visible wavelengths. Beneficially, this affords substantially transparent polarizer protective nanocomposite layers.

In one preferred embodiment, relatively thin polarizer protective layers comprise a nanocomposite material including TAC and titanium dioxide nanoparticles. The fabrication sequence described above provides substantially uniform loading of the nanoparticles. The magnitude of the out-of-plane birefringence, the degree of UV absorption and the dimensional stability are proportional to the degree of loading of the titanium dioxide in the resultant nanocomposite material. However, if the loading is too great, the resultant layer may become brittle. In that case, it may be more practical to use the nanocomposite as a coating instead of a single film. High loadings in TAC are illustrated in commonly assigned copending application Ser. No. 10/734,869 (docket 89720), hereby incorporated by reference.

As mentioned above, the nanocomposite materials provide polarizer protective layers in one embodiments having (negative) out-of-plane birefringence in the range of approximately −0.002 to approximately −0.02. For polarizer protective layers having a thickness of approximately 20 μm, this provides a (negative) out-of-plane optical retardation (Rth) in the range of approximately −40.0 nm to approximately −400 nm. Naturally, for thicker layers, the retardation is greater and for thinner layers, the retardation is less than achieved with the illustrative 20 μm thick layer.

The polarizer protective nanocomposite layers according to the present invention can provide improved dimensional stability. Preferably, the dimensional change of the polarizer protective layer is less than approximately 0.2% in a temperature range between approximately 20° C. and approximately 110° C.

In a specific embodiment, the dimensional change in the polarizer protective layer at approximately 80° C. is in the range of approximately 0.034% to approximately 0.047%, with the greater change corresponding to a layer having comparatively lower loading of titanium oxide and the lesser change corresponding to a layer having comparatively greater loading.

The polarizer protective nanocomposite layers according to the present invention can provide improved mechanical stiffness. Preferably, the Young's Modulus of the polarizer protective layer is higher than approximately 2.5 GPa at temperature range between approximately 20° C. and approximately 110° C. In a specific embodiment, the Young's Modulus of the polarizer protective layer at room temperature is in the range of approximately 3.4 GPa to 4.2 GPa, with the lower modulus corresponding to a layer having comparatively lower loading of titanium oxide and the higher modulus corresponding to a layer having comparatively greater loading. Similarly, at 80° C., the Young's Modulus in the polarizer protective layer is in the range of approximately 3.1 GPa to 4.0 GPa, with the lower modulus corresponding to a layer having comparatively lower loading of titanium oxide and the higher modulus corresponding to a layer having comparatively greater loading.

Because of the relatively stable dimensions and high storage modulus, the polarizer using the polarizer protective nanocomposite layers according to the present invention are substantially stable. As noted previously, it is beneficial to provide substantial UV protection to many polarizers and, in LCD applications, to the LC material to reduce degradation. Therefore, in one specific embodiment, titanium oxide nanoparticles are chosen for the polarizer protection layer because of their relatively high absorption of UV radiation. Naturally, the greater the loading of the titanium oxide nanoparticles in the nanocomposite material of the polarization protection layer, the greater the UV absorption attained.

Nanocomposites according to the present invention, and methods of making the same, are also useful for controlling birefringence dispersion in the field of display and other optical applications, as disclosed in commonly assigned copending application Ser. No. 11/208,974 (docket 91071), hereby incorporated by reference. As indicated above, birefringent media are characterized by three indices of refraction, $n_x$, $n_y$, and $n_z$, and they are functions of the wavelengths $\lambda$ of interest. Accordingly, birefringence, both in-plane defined by $\Delta n_{in}=nx-ny$ ($nx \geq ny$) and the out-of-plane birefringence given by $\Delta n_{th}=nz-(nx+ny)/2$ also depends on $\lambda$. Such a dependence of birefringence on $\lambda$ is typically called dispersion property. Birefringence dispersion is an essential property in many optical components such as achromatic retarder films and compensation films used to improve the liquid crystal display image quality. Adjusting both $\Delta n_{in}$ and $\Delta n_{th}$ dispersion is a critical process to optimize the performance of such optical components. The nanocomposite films of the present invention have the advantage of combining the processability of polymers and the properties of inorganics to provide versatile birefringence dispersion behavior. Such nanocomposites can also exhibit high optical transmittance and low haze.

EXAMPLES

Illustrative fabrication sequences of the in-situ nanocomposite synthesis and illustrative nanocomposite materials formed thereby are described. It is emphasized that the examples that follow are merely illustrative and other components, materials and sequences are contemplated.

In the following examples:
TIP is the nanoparticle precursor, titanium isopropoxide.
TiEtOH is the nanoparticle precursor, titanium ethoxide.
ZrP is the nanoparticle precursor zirconium propoxide.
AlB is the nanoparticle precursor tri-sec butoxide.
DCM is the organic solvent dichloromethane.
BuOH is the organic solvent butanol.
EtOH is the organic solvent ethanol.
THF is the organic solvent tetrahydrofuran.
TAC is the polymer cellulose triacetate.
PS is the polymer polystyrene.
PMMA is the polymer polymethylmethacrylate
RH is the relative humidity.
TEM is transmission electron microscope or microscopy.

Synthesis of Copolymer P-1

Copolymer P-1 was obtained by the copolymerization of styrene and (acryloxypropy)l trimethoxysilane (APTMS) monomers. Under Argon protection, a 50 ml flask was charged with 27.5 ml anhydrous toluene, 10 g (96 mmol) of styrene and 8.3 g (32 mmol) of APTMS. The solution was stirred for 5 minutes and 64 mg of 2,2'-azobis(2,4-dimethylpentanenitrile) was added to the solution. The solution was then heated to 60° C. for 20 hours, after which it was cooled to room temperature and precipitated into 1 liter heptane. The polymer precipitate was collected by filtration, re-dissolved into 50 ml toluene and re-precipitated into 1 liter heptane. The product washed with heptane several times and dried at 1 mTorr vacuum overnight to yield 8.5 g (46%) of dried polymer.

Example 1

15 TIP:85 TAC

A solution consisting of 18 wt. % the precursor TIP, in a solvent mixture consisting of 50:50 DCM/BuOH by weight, was added drop wise to a 10 wt. % cellulose triacetate (TAC) solution in DCM under vigorous stirring. Stirring was continued for five minutes. The resulting weight ratio of TIP to TAC was 15:85. Following the addition of the TIP solution, sonication was utilized to remove bubbles. The resulting sonicated mixture was then applied on bare polyester sheet at a controlled temperature of 21° C. and RH of 30% using a doctor blade. The coated polyester sheet was immediately covered to slow the rate of drying using a prefabricated box.

After 60 minutes, the dried film was scored with a razor blade and lifted from the polyester carrier sheet. The resulting freestanding film was cured in an oven having a 70° C. and 95% RH environment for 12 hours. This film was then further dried at 100° C. for 30 min.

The resultant film was optically clear and had a thickness of 30 micrometers. The transmittance was 92% for light of visible wavelengths. Illustratively, this transmissivity was achieved using light having a wavelength of 550 nm, although other visible wavelengths are substantially equally transmissive.

Transmission electron microscopy (TEM) analysis showed that the titanium-oxide nanoparticles were mainly dispersed as nano-sized dark contrast regions with each less than 10 nm in diameter. Such regions were seen as small dark dots dispersed randomly in its polymer matrix, in FIG. 1. FIG. 1 shows a TEM image of 15% TIP in 85% TAC according to this Example 1, showing the well-dispersed nanoparticles inclusions in the polymer matrix. Most of the dark contrast Ti—O regions were less than 10 nm in diameter.

Example 2

10 TIP:90 P-1

A 16 wt. % solution of P-1 was formed in toluene. Next, precursor TIP was added to the P-1 solution dropwise under vigorous stirring. The resultant weight ratio of TIP to P-1 was about 10:90. A clear solution was formed. The solution was spin coated on a cellulosic triacetate film at 2000 rpm at ambient condition of 50% RH and 21° C. The film was dried at an ambient condition of 50% RH and 21° C. and was further annealed at 100° C. under vacuum for about 2 hours. The film coated was substantially optically clear. The transmissivity was 90% for light of visible wavelengths.

The titanium oxide nanoparticles appeared well dispersed in the modified polystyrene matrix when analyzed by TEM using a thin microtomed section. The morphology of the titanium oxide nanoparticles was similar to that shown in FIG. 1.

Example 3

10 ZrP:90 P-1

A 10% by wt. solution of P-1 in toluene was formed. The precursor zirconium propoxide (ZrP) (Alderich) was added to the P-1 solution and balance toluene was added. The final concentration was 10 wt. %. The resulting weight ratio of ZrP to P-1 was 10:90. Following the addition of the ZrP solution, sonication was utilized to mix well the solution. The resulting sonicated mixture was spin coated on bare polyester sheet at a controlled temperature of 21° C. and RH of 30% at 1000 rpm.

The resultant film was optically clear. TEM analysis showed that the distribution of the Zr-oxide-rich phase in the polymer matrix was similar to that shown in FIG. 1.

Example 4

10 AlB:90 P-1

A 10% (by wt.) solution of P-1 in toluene was formed. The precursor aluminum tri-sec butoxide (AlB) (Alderich) was added to P-1 solution and balance toluene was added. The final concentration was 10 wt. %. The resulting weight ratio of AlB to CP-1 was 10:90. Following the addition of the AlB solution, sonication was utilized to mix well the solution. The resulting sonicated mixture was spin coated on bare polyester sheet at a controlled temperature of 21° C. and RH of 30% at 1000 rpm.

The resultant film was optically clear. TEM analysis showed that the distribution of the Al-oxide-rich phase in this matrix was similar to that shown in FIG. 1.

Example 5

10 TIP:90 PS

A solution consisting of 15 wt. % of polystyrene (PS) in toluene was prepared. Next, precursor titanium isopropoxide (TIP) was added dropwise to the solution under vigorous stirring. The resultant weight ratio of TIP to PS was about 10 to about 90. A clear solution was formed. The solution was coated using a doctor blade on glass at room temperature in ambient environment of 20% RH. The coating was dried in ambient condition (20% RH at 21° C.) for 24 hours. The film was further annealed at 100° C. under vacuum for 2 hours. A freestanding nanocomposite film, with titanium oxide nanoparticles, having a thickness of 20 µm was peeled away from the glass support. The film was optically transparent. The transmissivity was 87% for light of visible wavelengths. Illustratively, this transmissivity was achieved using light having a wavelength of 550 nm, although other visible wavelengths are substantially equally transmissive.

Figure 2:
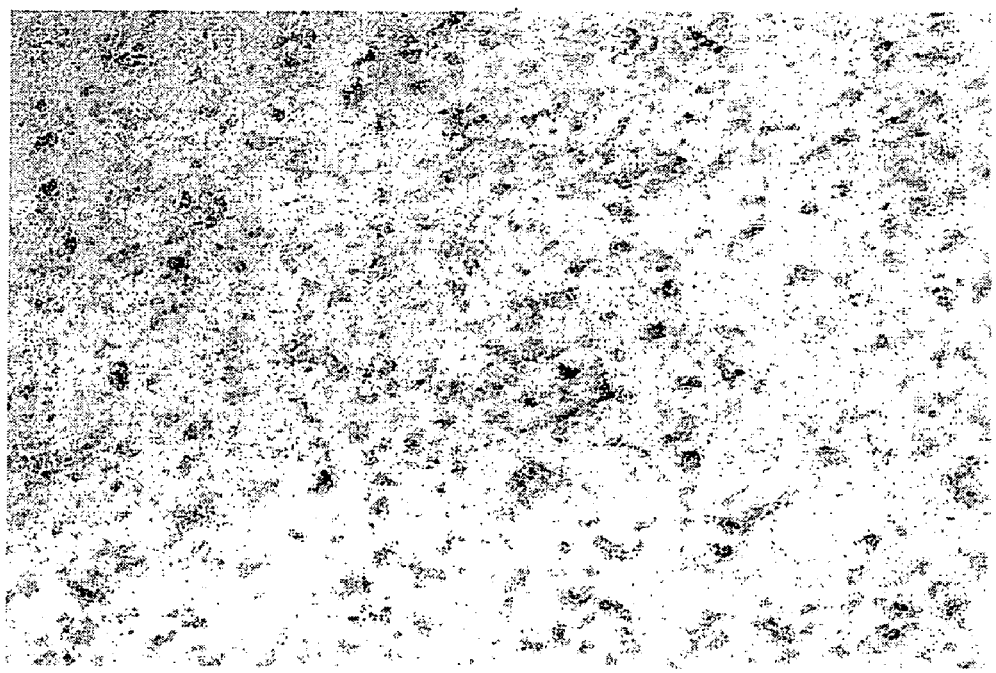
FIG. 2 is a transmission electron microscopy (TEM) image of a second embodiment of a nanocomposite material in accordance with Example 5.

TEM analysis of a thin microtomed section showed that the titanium-oxide nanoparticles were homogenously distributed in the mixture with a morphology in which the dark contrast titanium-oxide rich regions were mainly less than 50 nm in size, as shown in FIG. 2.

Example 6

10 TIP:90 PMMA

The precursor TIP and balance organic solvent DCM was added drop wise to a solution consisting of 20 wt. % PMMA in DCM by weight under vigorous stirring using a Cowels mixer. The resulting weight ratio of TIP to PMMA was 10:90. Following the addition of the TIP solution, sonication was utilized to remove bubbles. The resulting sonicated mixture was then applied on bare polyester sheet at a controlled temperature of 21° C. and RH of 30% using a doctor blade. The coated polyester sheet was immediately covered to slow the rate of drying using a prefabricated box.

After 60 minutes, the dried film was scored with a razor blade and lifted from the polyester carrier sheet. The resulting freestanding film was dried in a vacuum oven at 50° C. overnight.

The resultant film was optically clear and had a thickness of 33 micron. The transmittance was 92% for light of visible wavelengths. Illustratively, this transmissivity was achieved using light having a wavelength of 550 nm, although other visible wavelengths are substantially equally transmissive.

Figure 3:
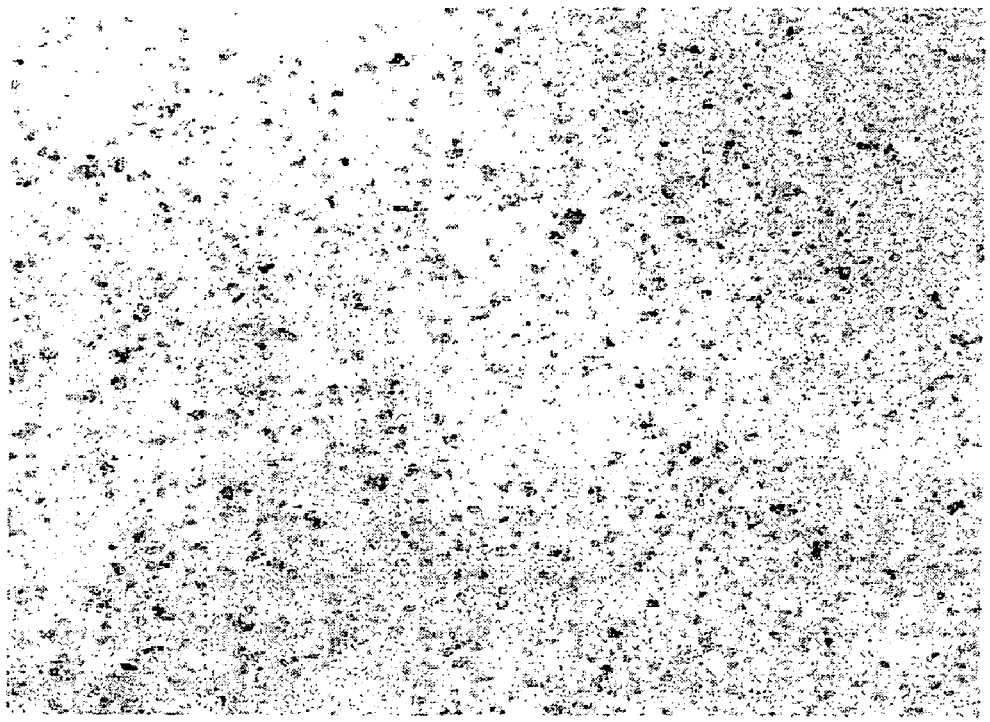
FIG. 3 is a transmission electron microscopy (TEM) image of a third embodiment of a nanocomposite material in accordance with Example 6.

TEM analysis of a thin microtomed section showed that the titanium-oxide nanoparticles were randomly distributed in the polymer matrix with a morphology in which the darkly contrasting titanium-oxide nanoparticles were predominantly less than 50 nm in size, as shown in FIG. 3.

Comparative Example 1

10 TIP:90 TAC:Water:Acid

Figure 4:
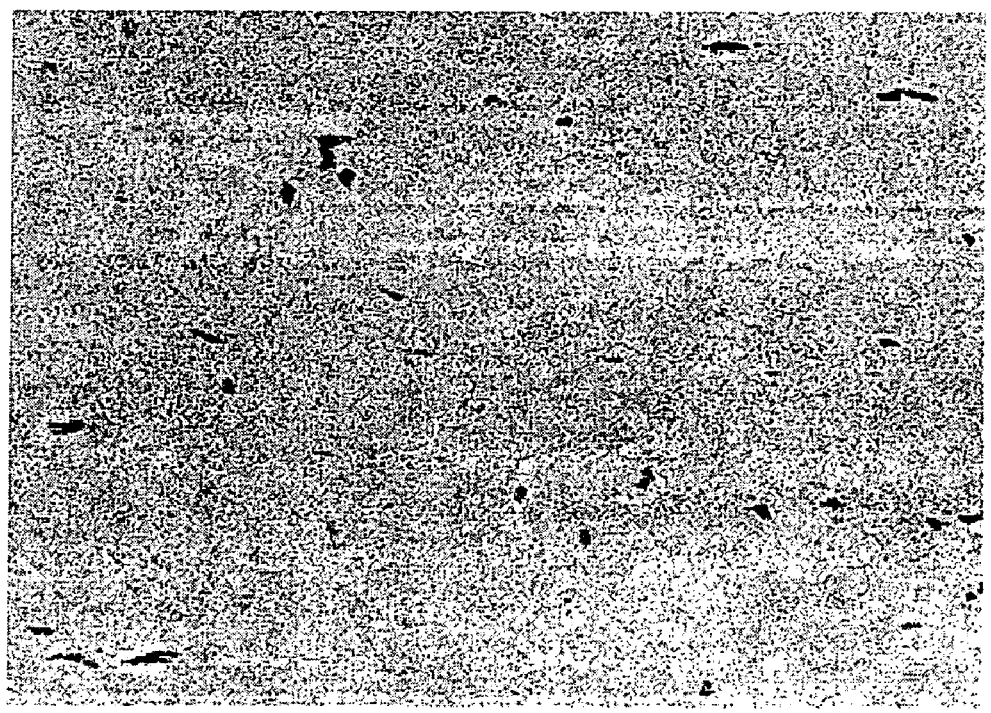
FIG. 4 is a transmission electron microscopy (TEM) image of a nanocomposite material in accordance with Comparative Example 1.

The precursor TIP was added to organic solvent DCM to form a 10 wt. % solution. To this solution, water (with 0.06 wt. % $HNO_3$) was added so that the weight ratio of $H_2O$:TIP was equal to 0.005:1. A slightly cloudy solution was formed. A 10 wt. % of TAC solution in DCM was made. Then the two solutions were mixed together. The resulting weight ratio of TIP to TAC was 10:90. The resulting solution was then sonicated to make it more homogenous. This mixture was then applied on bare polyester sheet at a controlled temperature of 21° C. and RH of 30% using a doctor blade. The coated polyester sheet was immediately covered to slow the rate of drying using a prefabricated box. The film contained nanoparticles as shown in FIG. 4.

TEM analysis revealed plate-like darkly contrasting regions, with the long direction usually parallel to the coating direction. These titanium oxide nanoparticle varied in length between 0.1 and 0.05 micron (100 nm to 500 nm) in the long direction and varied in thickness between about 50 and 100 nm in the short direction. Also, white particles were visible in the film. It is believed that the relatively large titanium-oxide particles had formed, prior to coating, because of the presence of acid catalyst and water.

Comparative Example 2

10TiEtOH:90 TAC

Figure 5:
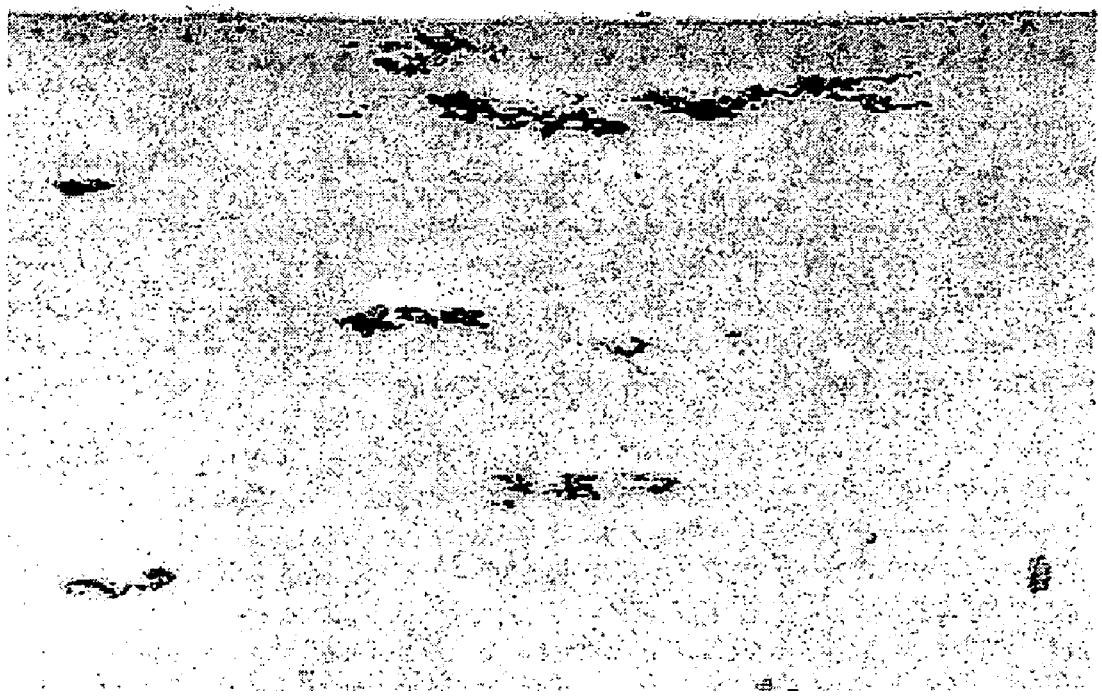
FIG. 5 is a transmission electron microscopy (TEM) image of a nanocomposite material in accordance with Comparative Example 2.

A solution was formed by adding 10 grams of titanium ethoxide (Gelest Co., PA) to 45 grams of ethanol (EtOH), after which 45 grams of the organic solvent DCM was added to the formed solution. A 10% by wt. solution of TAC in DCM was formed. Then the two solutions were mixed together. The resulting weight ratio of TiEtOH to TAC was 10:90. The solution was then sonicated to make it more homogenous. The resulting sonicated mixture was then applied on bare polyester sheet at a controlled temperature of 21° C. and RH of 30% using a doctor blade. The coated polyester sheet was immediately covered to slow the rate of drying using a prefabricated box. The film was fairly transparent but exhibited some haze. TEM analysis indicated the presence of linear, platelet-like darkly contrasting nano-regions. These nano-regions spanned more than 200 nm in length and had thicknesses of 50 to 100 nm, as shown in FIG. 5, and resembled the features described in Comparative Example 1. The TiEtOH solution, in a solvent mixture of 50DCM/50EtOH, was measured using a particle size analyzer, the 90Plus Particle Sizer (Brookhaven Instruments Corporation, New York). There was significant particle growth with time, as shown in Table 1, compared to TIP solution in a solvent mixture of 50DCM/50BuOH, as used in Example 1.

TABLE 1

| Time | Particle Size (nm) for TiEtOH in EtOH/DCM | Particle Size (nm) for TIP in BuOH/DCM |
| --- | --- | --- |
| 0 | 4.5 | 0 |
| 6 hours | 715 | 0 |
| 24 hours | 800 | 0 |

It is believed that TiEtOH is very reactive and reacts with water present in the ethanol solvent, resulting in relatively large particles forming in the solution prior to coating.

Comparative Example 3

$TiO_2$ Particles in PS

A nanocomposite material was prepared using a known process for comparison with nanocomposite materials in accordance with the present invention. In particular, a nanoparticulate $TiO_2$ powder was obtained. The average particle size of the powder was 20 nm. A 5 wt. % $TiO_2$ suspension in toluene was made and a surfactant was added. The resultant suspension was put in with 1.25 mm zirconium silicate media and ball milled for a week. A colloid suspension was obtained. The suspension was then added to 5 wt. % PS solution in toluene under vigorous stirring. The resulting weight ratio of $TiO_2$ to PS was 5:95. The resulting suspension was spin coated at 1000 rpm on clean glass. The resultant coating was not transparent (i.e., white). This lack of transparency is indicative of nanoparticle agglomeration that is deleterious in many applications of the nanocomposite. Notably, all nanocomposite films of the inventive examples above were substantially transparent because the nanoparticle domain size was smaller than a fraction of the wavelength of light such that there was no significant scattering from the nanoparticles.

The Table below summarizes the results from Examples 1 to 6 and the Comparative Examples 1 to 3 in terms of nanoparticle loading as confirmed by TGA: thermal gravimetric analysis.

TABLE 2

| Example | Composition (Weight ratio) | Nanoparticle Loading (wt %) |
| --- | --- | --- |
| 1 | TAC/TIP (85/15) | 4.7 |
| 2. | P-1/TIP (90/10) | 3 |
| 3 | P-1/ZrP (90/10) | 3 |
| 4 | P-1/$Al_2O_3$ (09/10) | 3 |
| 5 | PS/TIP (90/10) | 3 |
| 6 | PMMA/TIP (90/10) | 3 |
| Comparative 1 | TAC/TIP (90/10) (water) | 3 |
| Comparative 2 | TAC/TEO (90/10) | 3 |
| Comparative 3 | TAC/$TiO_2$ | |

Example 7

15 TIP:85 TAC

This example illustrates the preparation of a polarizer protective film according to the present invention. TIP in the amount of 2.34 g of 18% TIP in 50:50 DCM/BuOH was added drop-wise at a rate of 1 g/min to a premix of 2.40 g of cellulose triacetate powder in 31.35 g DCM and 2.00 g BuOH using a Cowles blade stirring at 2000 rpm. Stirring was continued for five minutes following the addition. Sonification was utilized to remove bubbles during this combination step. The resulting sonified mixture was then applied at 260 micrometer (24 cc/ft$^2$) wet coverage on a bare polyester sheet at a controlled temperature of 10° C. The wet application was immediately covered to slow the rate of drying using a prefabricated box thus creating a nearly closed environment. After 60 min, the dried application was scored with a razor blade and lifted from the polyester carrier. The resulting freestanding film was then annealed under various conditions to achieve the desired properties.

Comparative Example 4

TAC

A 10% solution was prepared by combining 1.60 grams of cellulose triacetate powder with 16.0 grams of DCM. Sonification was utilized to remove bubbles. This sonified solution was applied at 150 micrometer (24 cc/ft$^2$) wet coverage on a bare polyester sheet at a controlled temperature of 10° C. The wet application was immediately covered to slow the rate of drying using a prefabricated box thus creating a nearly closed environment. At a time of 60 min, the dried application was scored with a razor blade and lifted from the polyester carrier sheet. The resulting freestanding film was annealed under various conditions to achieve the desired properties.

Optical measurements including refractive index, birefringence, and UV-Visible spectrum were made using a M-2000V Spectroscopic Ellipsometer.

Dimensional change was measured at 80° C. and 110° C. using a TA instruments 2940 TMA, with the dimensional change being defined as the percentage dimensional change compared to the length of the film at ambient temperature. Thermal dynamic measurement was made using a Rheometric RSAII solid state analyzer, with the storage moduli at ambient temperature (25° C.) and at 80° C. being used to characterize the stiffness/rigidity of the film.

The following Table 3 shows the optical and mechanical data for the nanocomposite film of Example 7 comprising titanium dioxide nanoparticles and TAC. Enhanced out-of-plane birefringence, excellent optical clarity at visible range, and improved thermal dimensional stability and mechanical properties were obtained.

As can be appreciated from the data of Table 3, the nanocomposite polarizer protective nanocomposite layer has improved out-of-plane birefringence, dimensional stability and storage modulus stability compared to a TAC layer (comparative Example 4). Moreover, as the loading of titanium nanoparticles increases, there is improved out-of-plane birefringence, dimensional stability and storage modulus stability. Thus, the desirable properties of the polymer and the desirable properties of titanium dioxide are provided in the polarizer protective nanocomposite layer of the Example 7.

Example 8

A solution of 15 wt % of polystyrene (PS) (Dow Chemical.) in toluene was prepared. Next, titanium isopropoxide (TIP)(Aldrich) was added dropwise to the solution under vigorous stirring. The resultant weight ratio of TIP to PS was 10 to 90. A clear solution was formed. The solution was coated using a doctor blade on a 4 mil thick PET substrate at room temperature in ambient environment of 20% RH. The coating was dried in ambient condition (20% RH at 21° C.) for 24 hours. The film was further annealed at 100° C. under vacuum for 2 hours. A freestanding nanocomposite film having titanium oxide nanoparticles in the amount of 3 wt % and having a thickness of 20 μm was peeled off. The film was optically transparent. The birefringence of the film was measured using M-2000V Spectroscopic Ellipsometer. The birefringence spectra of Example 8 showed a flat out-of-plane birefringence dispersion.

| PARTS LIST: | |
|---|---|
| 2 | rear polarizer plate |
| 4 | front polarizer plate |
| 5 | cover sheet composite |
| 10 | LCD cell |
| 12 | layer promoting adhesion |
| 14 | low birefringence protective film |
| 15 | moisture barrier layer |
| 16 | antiglare layer |
| 18 | anti-reflection layer |
| 19 | antistatic layer |
| 20 | carrier substrate |
| 22 | viewing angle compensation layer |
| 25 | cover sheet |

The invention claimed is:
1. A method of fabricating a nanocomposite material in the form of a film, the method comprising generating nanoparticles in-situ within a polymer matrix by:
   (a) forming a coating solution of a nanoparticle precursor and a polymer dissolved in a substantially non-aqueous carrier liquid comprising one or more organic solvents, wherein catalyst is essentially absent in the coating solu-

TABLE 3

| Example | Protective Film | TiO$_2$ Wt % | Out-of-Plane Birefringence | Transmission @ 460 nm % | Dimensional change at 80° C. % | Dimensional change at 110° C. % | Modulus at 25° C. GPa | Modulus at 80° C. GPa |
|---|---|---|---|---|---|---|---|---|
| 7 | TAC- 15% TIP | 5 | −0.0047 | 91 | 0.034% | 0.164% | 3.4 | 3 |
| Comparative 4 | TAC | 0 | −0.002 | 91 | 0.122% | 0.252% | 2.6 | 2.56 | tion, wherein the nanoparticle precursor is a condensation polymerizable reactive metal compound comprising a metal atom, which is a transition metal or a metal in Group 3B or 4B of the Periodic Table, and at least two hydrolyzable leaving groups, wherein the amount of nanoparticle precursor in the coating solution is at least 5 weight percent relative to the total polymer, wherein the polymer is a vinyl polymer, an acrylic or styrene polymer or copolymer, or a cellulosic polymer, wherein the coating solution comprises less than 0.2 weight percent water, and wherein the coating solution contains substantially no nanoparticles greater than 2 nm before coating;

(b) applying the coating solution onto a substrate in an environment having a controlled relative humidity that is between 2 and 50 percent to form a coating and then removing organic solvent from the coating, thereby forming a gel;

(c) converting the nanoparticle precursor into nanoparticles in a polymer matrix to form a nanocomposite; and (d) drying the nanocomposite to remove remaining organic solvent from the nanocomposite;

wherein the nanoparticles in the nanocomposite comprise predominantly nanoparticles having a maximum dimension of not more than 50 nm.

2. The method of claim 1 wherein components of the coating solution in step (a) are selected such that the nanoparticle precursor is essentially stable and unreacted prior to applying the coating solution onto the substrate.

3. The method of claim 1 wherein the gel in step (b) comprises the nanoparticle precursor and/or intermediate homogenously dissolved in a matrix of the polymer.

4. The method of claim 1 wherein the carrier liquid comprises an organic solvent that is ethylene glycol or a compound having at least three carbon atoms and at least one hydroxy group.

5. The method of claim 4 wherein the organic solvent is an alcohol selected from the group consisting of butanol, isopropyl alcohol, and ethylene glycol.

6. The method of claim 1 wherein the carrier liquid is free of methanol or ethanol.

7. The method of claim 1 wherein water is not present in the coating solution in step (a) in an effective amount to substantially hydrolyze the nanoparticle precursor.

8. The method of claim 7, wherein the coating solution comprises water in an amount of less than 25 weight percent, relative to the nanoparticle precursor.

9. The method of claim 1, wherein the metal atom is selected from the group consisting of aluminum, titanium, tin, indium, and zirconium.

10. The method of claim 1, wherein a nanoparticle precursor comprising silicon is substantially absent from the coating solution used to make the nanocomposite.

11. The method of claim 1 wherein the nanoparticle precursor is a metal compound having leaving groups containing three to six carbon atoms.

12. The method of claim 1, wherein the nanoparticle precursor is a titanium alkoxide.

13. The method of claim 12, wherein the nanoparticle precursor is a titanium alkoxide in which the ailcoxide has 3 to 6 carbon atoms.

14. The method of claim 1 wherein the nanoparticles are characterized by an average maximum dimension between 2 and 25 nm.

* * * * *